US011561784B2

(12) United States Patent
Wiegley et al.

(10) Patent No.: US 11,561,784 B2
(45) Date of Patent: Jan. 24, 2023

(54) VERSIONING OF PIPELINE TEMPLATES FOR CONTINUOUS DELIVERY OF SERVICES ON DATACENTERS CONFIGURED IN CLOUD PLATFORMS

(71) Applicant: salesforce.com, inc., San Francisco, CA (US)

(72) Inventors: Douglas James Wiegley, Boise, ID (US); Apoorv Mahajan, Foster City, CA (US); Dmitri Sergeyevich Kiselev, Los Gatos, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/157,583

(22) Filed: Jan. 25, 2021

(65) Prior Publication Data
US 2022/0236976 A1 Jul. 28, 2022

(51) Int. Cl.
*G06F 8/65* (2018.01)
*G06F 8/41* (2018.01)
*H04L 67/10* (2022.01)
*H04L 67/75* (2022.01)

(52) U.S. Cl.
CPC .............. *G06F 8/65* (2013.01); *G06F 8/41* (2013.01); *H04L 67/10* (2013.01); *H04L 67/75* (2022.05)

(58) Field of Classification Search
CPC ... G06F 8/65; G06F 8/41; H04L 67/10; H04L 67/36
See application file for complete search history.

(56) References Cited

U.S. PATENT DOCUMENTS 11,018,938 B1 * 5/2021 Gupta ................. H04L 41/0813
11,093,321 B1 * 8/2021 Zeavelou ............ G06F 11/0793
(Continued)

OTHER PUBLICATIONS

Burns, E., "Why Spinnaker matters to CI/CD," Aug. 27, 2019, seven pages, [Online] [Retrieved on Jan. 19, 2021] Retrieved from the Internet <URL: https://opensource.com/article/19/8/why-spinnaker-matters-cicd>.
(Continued)

Primary Examiner — Daxin Wu
(74) Attorney, Agent, or Firm — Fenwick & West LLP

(57) ABSTRACT

Computing systems, for example, multi-tenant systems deploy software artifacts in data centers created in a cloud platform using a cloud platform infrastructure language that is cloud platform independent. The system receives pipeline templates including templating expressions that can be substituted with values for generating pipelines. A pipeline can be executed to perform a set of actions associated with continuous delivery of a software artifact. The system stores sets of partially hydrated pipeline templates. The partially hydrated pipeline templates can be compiled into executable pipelines associated with services configured on a datacenter of a cloud platform. The system stores different versions of pipeline templates as deployment packages. The system stores version pointers that identify specific deployment packages that are selected when a software release is deployed. The version pointers allow the deployment package to be updated in case of roll back or for deploying more recent changes.

20 Claims, 20 Drawing Sheets

(56) References Cited

U.S. PATENT DOCUMENTS

| | | | |
|---|---|---|---|
| 2016/0026452 A1* | 1/2016 | Dani | G06F 8/71 |
| | | | 717/170 |
| 2017/0177324 A1* | 6/2017 | Frank | G06F 9/44536 |
| 2020/0241864 A1* | 7/2020 | Duvur | G06F 8/65 |
| 2021/0004226 A1* | 1/2021 | Gungabeesoon | G06F 8/71 |
| 2021/0152627 A1* | 5/2021 | Pershin | G06F 16/2468 |
| 2021/0208859 A1* | 7/2021 | Kapadia | H04L 67/10 |

OTHER PUBLICATIONS

Mukherjee, J., "What is a continuous delivery pipeline?" Date Unknown, 14 pages, [Online] [Retrieved on Jan. 19, 2021] Retrieved from the Internet <URL: https://www.atlassian.com/continuous-delivery/pipeline>.

Thakur, V., "Continuous Delivery Pipeline for Kubernetes Using Spinnaker," May 27, 2020, 21 pages, [Online] [Retrieved on Jan. 19, 2021] Retrieved from the Internet <URL: https://www.metricfire.com/blog/continuous-delivery-pipeline-for-kubernetes-using-spinnaker/?GAID=undefined&GAID=undefined>.

* cited by examiner ature of a deployment module according to an embodiment.

VERSIONING OF PIPELINE TEMPLATES FOR CONTINUOUS DELIVERY OF SERVICES ON DATACENTERS CONFIGURED IN CLOUD PLATFORMS

BACKGROUND

Field of Art

This disclosure relates in general to continuous delivery of software artifacts in cloud computing platforms, and in particular to management of versions of pipeline templates used for managing software releases on cloud computing platforms.

Description of the Related Art

Organizations are increasingly replying on cloud platforms (or cloud computing platforms) such as AWS (AMAZON WEB SERVICES), GOOGLE cloud platform, MICROSOFT AZURE, and so on for their infrastructure needs. Cloud platforms provide servers, storage, databases, networking, software, and so on over the internet to organizations. Organizations maintain cloud infrastructure on cloud platforms using continuous delivery platforms that can manage and deploy applications on cloud platforms. Such continuous delivery platforms allow organizations to simplify software deployment process and manage applications, firewalls, clusters, servers, load balancers, and other computing infrastructure on the cloud platform. However, deploying software releases for services provided on a cloud platform using a continuous delivery platform can be complex. For example, different versions of software may have to be deployed on different services running on different cloud computing resources. Furthermore, each cloud platform uses different tools for managing the resources.

Software artifacts associated with services running on such cloud platform are deployed using continuous delivery platforms that allow users to specify pipelines for configuring the software release process. A large system such as a multi-tenant system may manage services for a large number of organizations representing tenants of the multi-tenant system and may interact with multiple cloud platforms. A multi-tenant system may have to maintain several thousand data centers on a cloud platform, each datacenter running several services. As a result, the system may have to manage several hundred thousand pipelines. Managing pipelines for such a system can be a time consuming and computation intensive process.

Furthermore, several developers and teams may be involved in a software release that results in deployment of services on a cloud platform. As a result, it is difficult to track the changes made to such pipelines. If a change results in issues in deployment of certain software artifacts or services, tracking the exact modification that resulted in the issue can be a cumbersome and error prone task. This results in high maintenance cost for supporting and tracking changes to software releases on cloud platforms.

Figure 1:
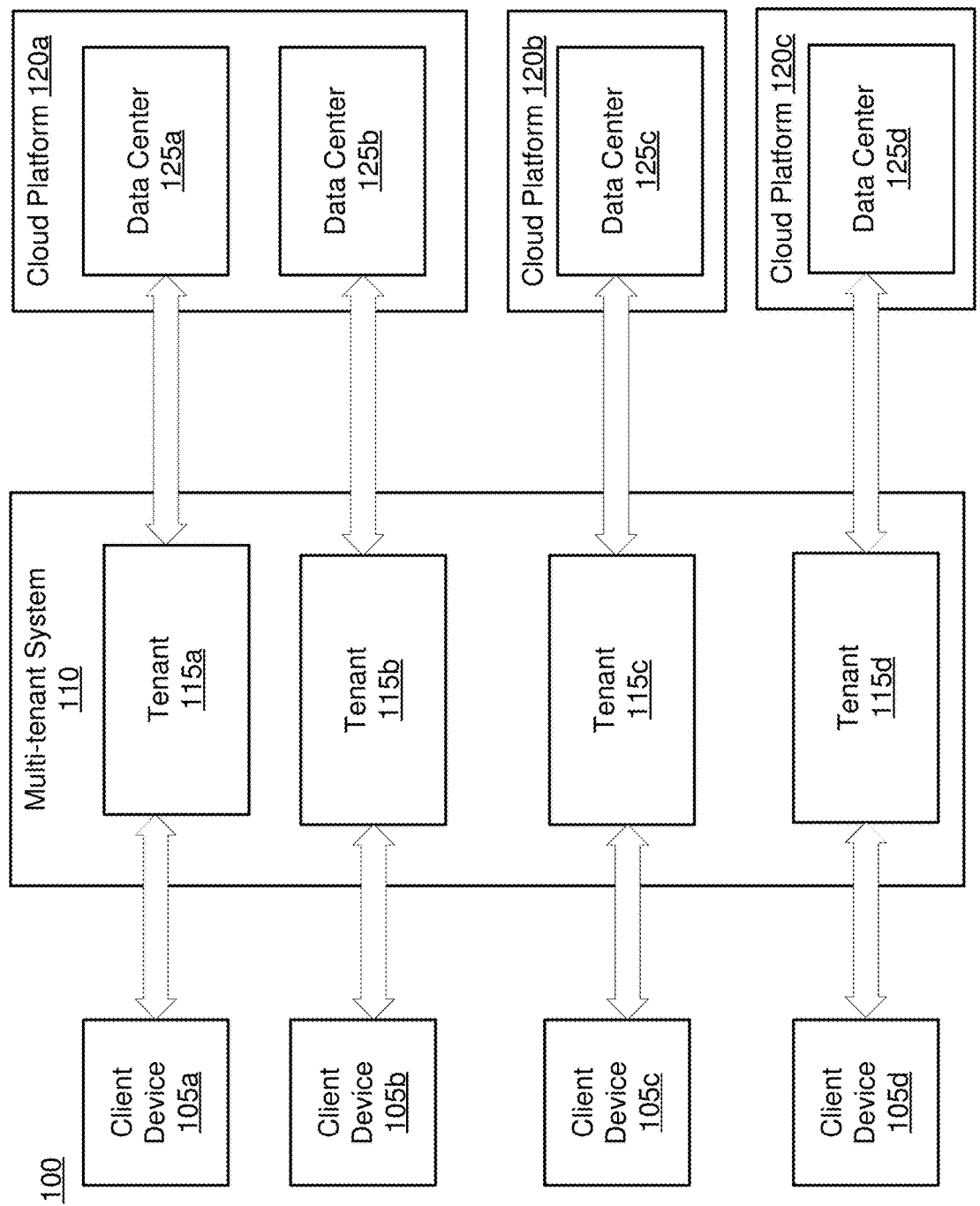
FIG. 1 is a block diagram of a system environment illustrating a multi-tenant system configuring data centers on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to minimize upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a data center using a cloud platform for use by users of the enterprise. However, implementing a data center on each cloud platform requires expertise in the technology of the cloud platform.

Embodiments create data centers in a cloud platform using a cloud platform infrastructure language that is cloud platform independent. The system receives a cloud platform independent declarative specification of a data center. The declarative specification describes the structure of the data center and may not provide instructions specifying how to create the data center. The cloud platform independent declarative specification is configured to generate the data center on any of a plurality of cloud platforms and is specified using a cloud platform infrastructure language. The system receives information identifying a target cloud platform for creating the data center and compiles the cloud platform independent declarative specification to generate a cloud platform specific data center representation. The system sends the cloud platform specific data center representation and a set of instructions for execution on the target cloud platform. The target cloud platform executes the instructions to configure the data center using the platform specific data center representation. The system provides users with access to the computing resources of the data center configured by the cloud platform.

In one embodiment, the system performs operations related to software releases on datacenters configured on a cloud platform, for example, deploying software releases, provisioning resources, performing rollback of software releases, and so on. The system accesses a data center configured on a target cloud platform. The datacenter is generated based on a cloud platform independent declarative specification comprising a hierarchy of data center entities. Each data center entity comprises one or more of (1) a service or (2) one or more other data center entities. The system generates a cloud platform independent master pipeline that comprises: (1) a sequence of stages for deployment of a software artifact, for example, a development stage, a test stage, and a production stage, and (2) criteria for promoting the software artifact from one stage to a subsequent stage of the sequence of stages. The system compiles the cloud platform independent master pipeline to generate a cloud platform dependent detailed pipeline for the target cloud platform with instructions for performing operations related to services according to the layout of datacenter defined by the declarative specification. The system executes the cloud platform dependent detailed pipeline on the target cloud platform, for example, to deploy software releases on datacenter entities of the datacenter.

In one embodiment, a system receives a cloud platform independent artifact version map associating data center entities of the data center with versions of software artifacts targeted for deployment on the datacenter entities. Each software artifact comprises executable instructions associated with a service configured for execution on one or more cloud platforms. The system generates a cloud platform specific master pipeline for the target cloud platform based on the cloud platform independent artifact version map. The cloud platform specific master pipeline comprises instructions to perform operations such as build and deploy appropriate versions of deployment artifacts for services on data center entities in accordance with the cloud platform independent version map. The system transmits the cloud platform specific deployment pipeline to the target cloud platform for execution. The artifact version map and the master pipelines can be used to perform various actions related to services including deployment of service, destroying services, provisioning resources for services, destroying resources for services, and so on.

According to an embodiment, the system receives metadata describing a datacenter configured on a cloud platform. The datacenter configured to execute a set of services on a cloud platform. The system receives a plurality of pipeline templates. A pipeline template comprises (1) instructions to perform a set of actions associated with releasing a software artifact on the cloud platform, (2) one or more templating expressions representing placeholders for values, and (3) one or more templating expressions representing references to pipelines. The system generates a plurality of partially hydrated pipeline templates from the plurality of pipeline templates. A partially hydrated pipeline template is generated by substituting one or more templating expressions of a pipeline template with actual values obtained from metadata describing the datacenter. The system generates a first set of pipelines from the plurality of partially hydrated pipeline templates. A pipeline is generated from the partially hydrated pipeline template by substituting one or more templating expressions representing links with corresponding pipeline identifiers. Responsive to a change in metadata describing the datacenter the system regenerates a partially hydrated pipeline template. The system generates a second set of pipelines from the plurality of partially hydrated pipeline templates including the regenerated partially hydrated pipeline template and one or more partially hydrated templates generated before the change in metadata. The set of pipelines may be sent for execution, for example, to a pipeline execution engine. The execution of a pipeline causes the set of actions associated with continuous delivery of the software release on the cloud platform.

According to an embodiment, the system generates a plurality of deployment packages associated with a datacenter entity. The datacenter entity may represent a set of services or a specific service running on the cloud platform. A deployment package represents a version of pipeline templates associated with the datacenter entity, wherein a pipeline template comprises (1) instructions to perform a set of actions associated with releasing a software artifact on the cloud platform, (2) one or more templating expressions representing placeholders for values. The system maintains in association with the datacenter entity, one or more version pointers. A version pointer represents a selected deployment package from the plurality of deployment packages. The system receives a request for deploying a software release associated with the datacenter entity and a version pointer. The system identifies the deployment package represented by the version pointer and generates a set of pipelines based on the deployment package. A pipeline represents a set of actions associated with continuous delivery of the software release on the cloud platform. The system sends the generated set of pipelines for execution.

According to some embodiments, generating of a deployment package is performed by receiving a request for a system configuration change associated with the datacenter entity, generating a deployment package based on a plurality of pipeline templates associated with the system configuration change, and storing the deployment package.

According to some embodiments, the system modifies the version pointer to point at a second deployment package from the plurality of deployment packages. The system receives a second request for deploying a second software release associated with the service. The system identifies the second deployment package represented by the version pointer, generates a second set of pipelines based on the second deployment package, and sends the second set of pipelines for execution.

The system may represent a multi-tenant system but is not limited to multi-tenant systems and can be any online system or any computing system with network access to the cloud platform. A cloud platform is also referred to herein as a substrate.

Overall System Environment

FIG. 1 is a block diagram of a system environment illustrating a multi-tenant system configuring data centers on cloud platforms according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105.

A cloud platform may also be referred to as a cloud computing platform or a public cloud environment. A tenant may use the cloud platform infrastructure language to provide a declarative specification of a datacenter that is created on a target cloud platform 120 and to perform operations using the datacenter, for example, provision resources, perform software releases and so on. A tenant 115 may create one or more data centers on a cloud platform 120. A data center represents a set of computing resources including servers, applications, storage, memory, and so on that can be used by users, for example, users associated with the tenant. Each tenant may offer different functionality to users of the tenant. Accordingly, each tenant may execute different services on the datacenter configured for the tenant. The multi-tenant system may implement different mechanisms for release and deployment of software for each tenant. A tenant may further obtain or develop versions of software that include instructions for various services executing in a datacenter. Embodiments allow the tenant to deploy specific versions of software releases for different services running on different computing resources of the datacenter.

The computing resources of a data center are secure and may not be accessed by users that are not authorized to access them. For example, a data center 125a that is created for users of tenant 115a may not be accessed by users of tenant 115b unless access is explicitly granted. Similarly, data center 125b that is created for users of tenant 115b may not be accessed by users of tenant 115a, unless access is explicitly granted. Furthermore, services provided by a data center may be accessed by computing systems outside the data center, only if access is granted to the computing systems in accordance with the declarative specification of the data center.

With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture

Figure 2A:
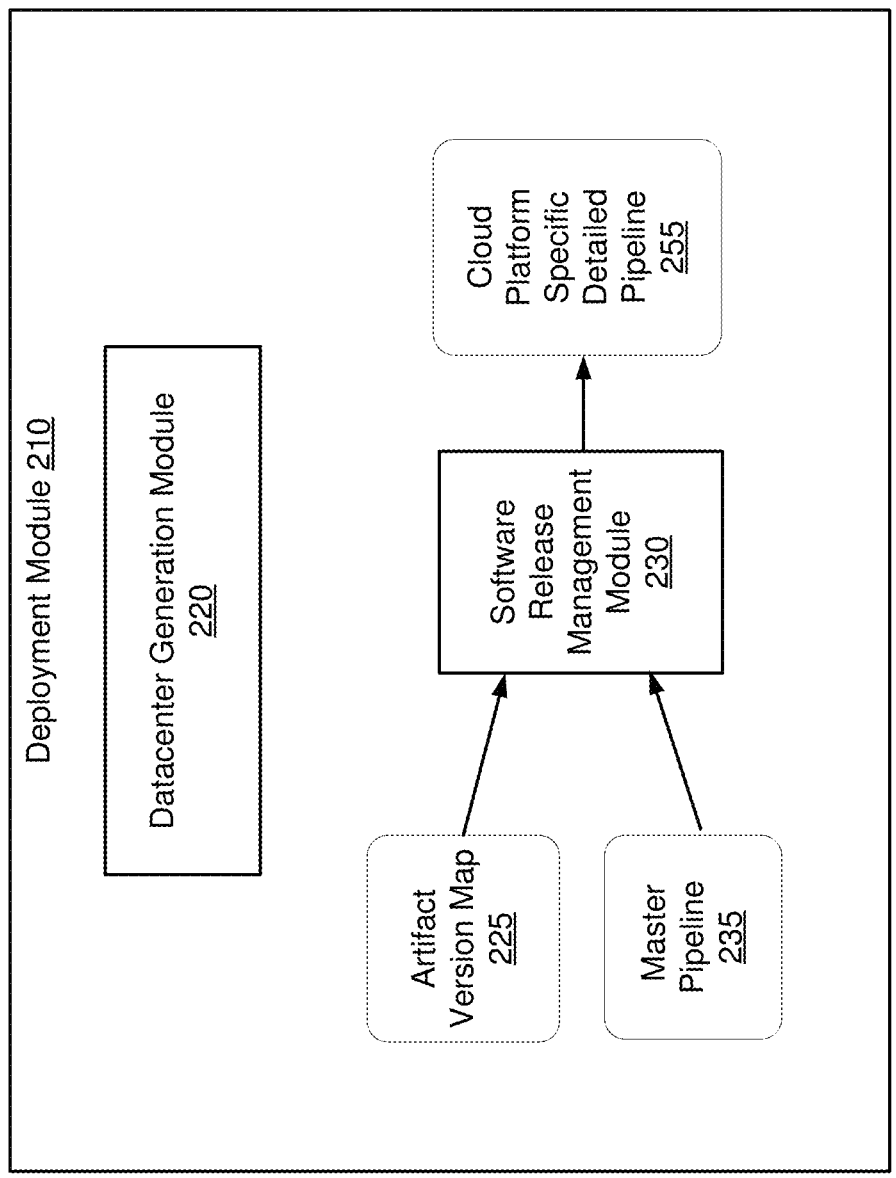
FIG. 2A is a block diagram illustrating the system architecture of a deployment module according to an embodiment.

The multi-tenant system 110 includes a deployment module for deploying software artifacts on the cloud platforms. The deployment module can perform various operations associated with software releases, for example, provisioning resources on a cloud platform, deploying software releases, performing rollbacks of software artifacts installed on datacenter entities, and so on. FIG. 2 is a block diagram illustrating the system architecture of a deployment module 210 according to an embodiment. The deployment module 210 includes a data center generation module 220 and a software release management module 230. Other embodiments can have different and/or other components than the ones described here, and that the functionalities can be distributed among the components in a different manner.

The data center generation module 220 includes instructions for creating datacenters on the cloud platform. The software release management module 230 includes instructions for deploying software releases or software artifacts for various services or applications running on the datacenters created by the data center generation module 220.

Figure 4:
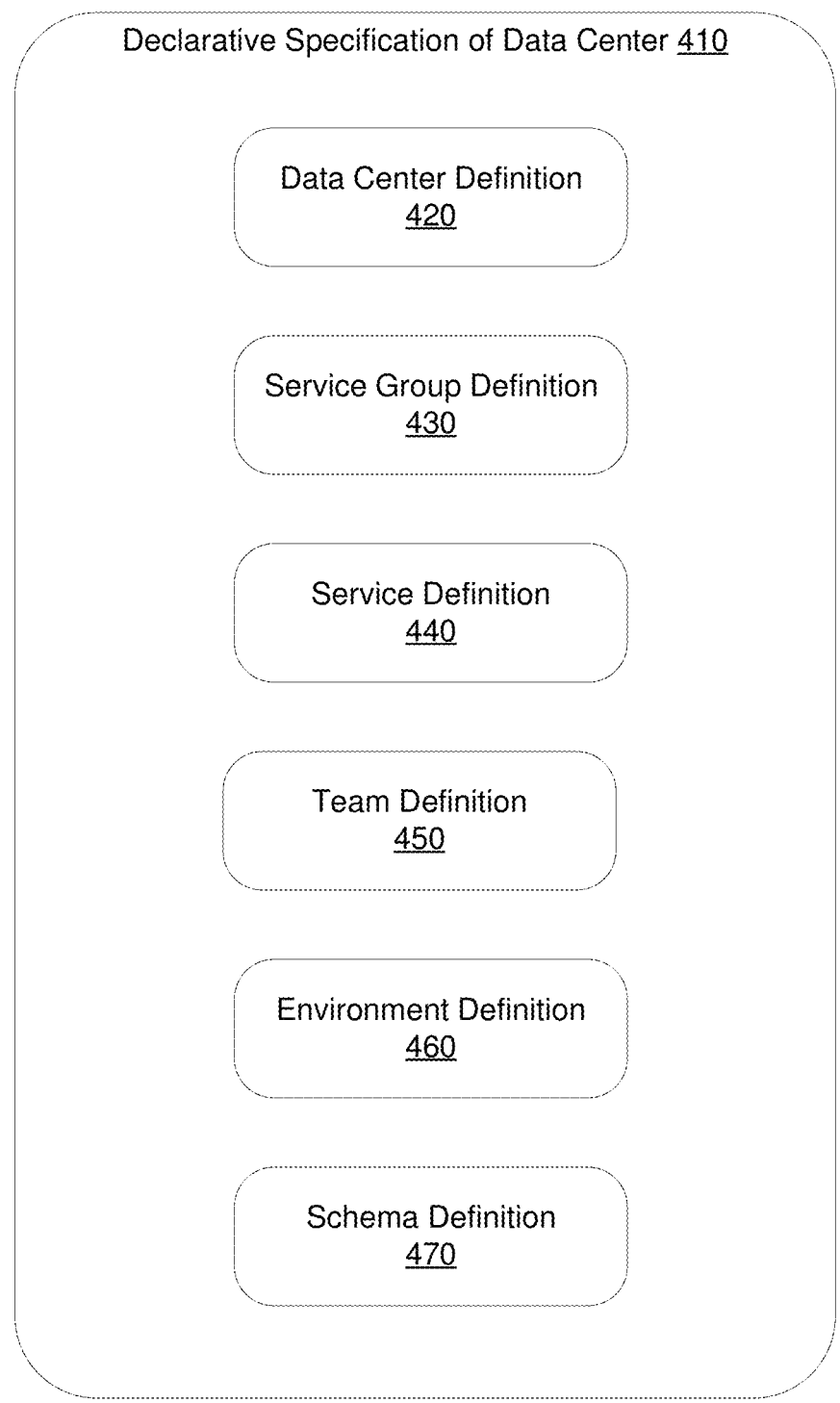
FIG. 4 illustrates an example of a data center declarative specification according to one embodiment.

The data center generation module 220 receives from users, for example, users of a tenant, a cloud platform independent declarative specification of a data center. The cloud platform independent declarative specification of a data center specifies various entities of the data center. In an embodiment, the cloud platform independent declarative specification of a data center comprises a hierarchical organization of datacenter entities, where each datacenter entity may comprise one or more services, one or more other datacenter entities or a combination of both. FIG. 4 describes various types of datacenter entities in further detail. The data center generation module 220 receives the platform independent declarative specification and a target cloud platform as input and generates a cloud platform specific metadata representation for the target cloud platform. The data center generation module 220 deploys the generated cloud platform specific metadata representation on the target cloud platform to create a data center on the target cloud platform according to the declarative specification.

The software release management module 230 receives as inputs (1) an artifact version map 225 and (2) a master pipeline 235. The artifact version map 225 identifies specific versions of software releases or deployment artifacts that are targeted for deployment on specific datacenter entities. The artifact version map 225 maps datacenter entities to software release versions that are targeted to be deployed on the datacenter entities. The master pipeline 235 includes instructions for operations related to software releases on the datacenter, for example, deployment of services, destroying services, provisioning resources for services, destroying resources for services, and so on.

The master pipeline 235 may include instructions for performing operations related to software releases for different environments such as development environment, test environment, canary environment, and production environment, and instructions for determining when a software release is promoted from one environment to another environment. For example, if the deployments of a software release in a development environment execute more than a threshold number of test cases, the software release is promoted for test environment for further testing, for example, system level and integration testing. If the software release in a test environment passes a threshold of test coverage, the software release is promoted to canary environment where the software release is provided to a small subset of users on a trial basis. If the software release in a canary environment executes without errors for a threshold time, the software release is promoted to production environment where the software release is provided to all users.

The software release management module 230 compiles the input artifact version map 225 and the master pipeline 235 to generate a cloud platform specific detailed pipeline 255 that is transmitted to the target cloud platform. The cloud platform specific detailed pipeline 255 includes instructions for deploying the appropriate version of a software release or deployment artifact on the datacenter entities as specified in the artifact version map 225. The software release management module 230 may receive modifications to one of the inputs. For example, a user may modify the input artifact version map 225 and provide the same master pipeline 235. Accordingly, the same master pipeline is being used but different software releases are being deployed on datacenter entities. The software release management module 230 recompiles the inputs to generate a new cloud platform specific detailed pipeline 255 that deploys the versions of software releases according to the new artifact version map 225.

The artifact version map may also be referred to as a deployment manifest, a version manifest, a software release map, or a software artifact version map. The master pipeline may also be referred to as a master deployment pipeline or a master orchestration pipeline.

Figure 2B:
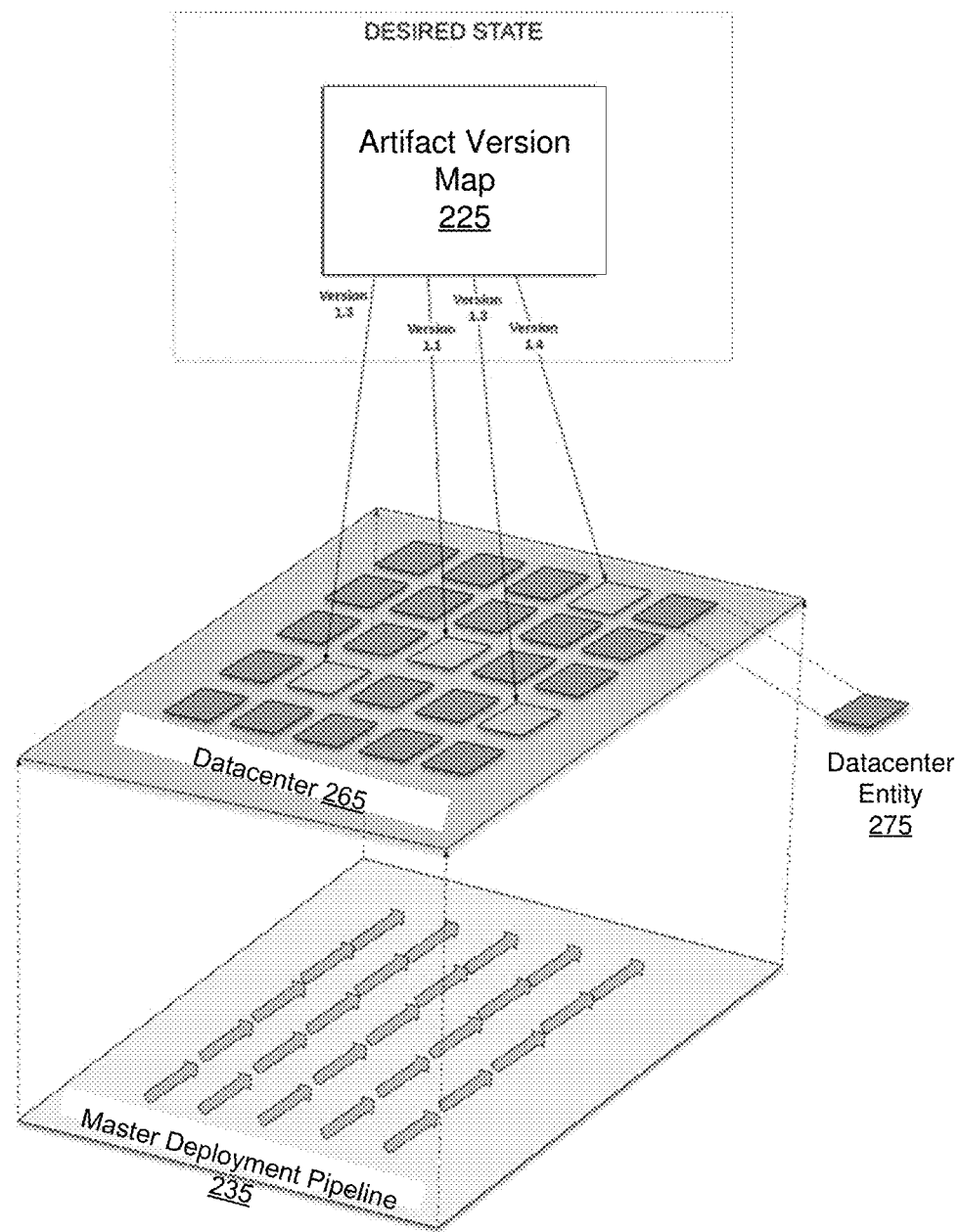
FIG. 2B illustrates the overall process for deploying software artifacts in a datacenter according to an embodiment.

FIG. 2B illustrates the overall process for deploying software artifacts in a datacenter according to an embodiment. FIG. 2B shows a layout of a datacenter 265 including various datacenter entities. As shown in FIG. 2B, the artifact version map 225 identifies the different versions of software that are targeted for release on different datacenter entities 275 of the datacenter 265. The master pipeline represents the flow of deployment artifacts through the various environments of the datacenter. The software release management module 230 combines the information in the master pipeline 235 with the artifact version map 225 to determine cloud platform specific detailed pipeline 255 that maps the appropriate version of software artifacts on the datacenter entities according to the artifact version map 225.

System Architecture

Figure 3:
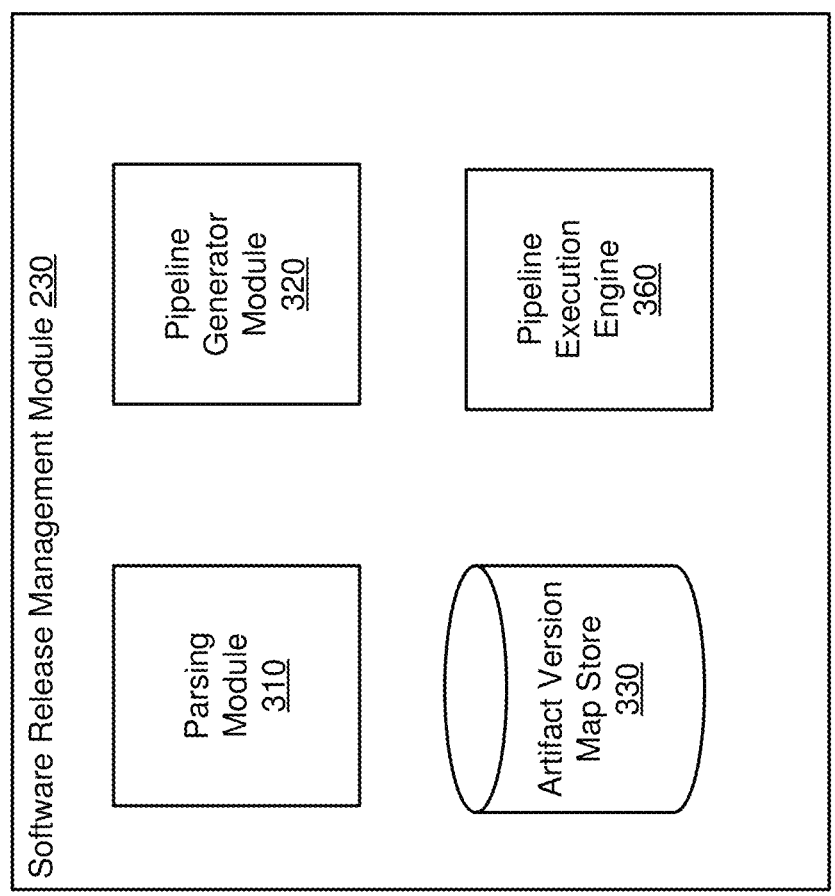
FIG. 3 is a block diagram illustrating the architecture of a software release management module according to one embodiment.

FIG. 3 is a block diagram illustrating the architecture of a software release management module 230 according to one embodiment. The software release management module 230 includes a parsing module 310, a pipeline generator module 320, an artifact version map store 330, and a pipeline execution engine 360. Other embodiments may include more, fewer, or different modules than those indicated herein in FIG. 3.

The parsing module 310 parses various types of user input including declarative specification of a data center, artifact version map 225, and master pipelines 235. The parsing module 310 generates data structures and metadata representations of the input processed and provides the generated data structures and metadata representations to other modules of the software release management module 230 for further processing.

A metadata store stores various transformed metadata representations of data centers that are generated by the software release management module 230. The transformed metadata representations may be used for performing rollback to a previous version if an issue is encountered in a current version of the data center. The transformed metadata representations may be used for validation, auditing, governance, and so on at various stages of the transformation process.

The pipeline generator module 320 processes the master pipelines in conjunction with the artifact version map received as input to generate a detailed pipeline for a target cloud platform. The pipelines comprise stages that include instructions for provisioning services or deploying applications for deploying versions of software releases for various services on the cloud platform according to the artifact version map. The artifact version map store 330 stores artifact version maps received from users.

The pipeline execution engine 360 executes the detailed pipelines generated by the pipeline generator module 320. In an embodiment, the pipeline execution engine 360 is a system such as SPINNAKER that executes pipelines for releasing/deploying software. The pipeline execution engine 360 parses the pipelines and executes each stage of the pipeline on a target cloud computing platform. The pipeline execution engine 360 may execute on a computing system of the cloud platform on which a datacenter is configured.

Cloud Platform-Based Data Center Generation

FIG. 4 illustrates an example of a declarative specification of a data center according to one embodiment. The declarative specification 410 includes multiple data center entities. A data center entity is an instance of a data center entity type and there can be multiple instances of each data center entity type. Examples of data center entities include data centers, service groups, services, teams, environments, and schemas.

The declarative specification 410 includes definitions of various types of data center entities including service group, service, team, environment, and schema. The declarative specification includes one or more instances of data centers. Following is a description of various types of data center entities and their examples. The examples are illustrative and show some of the attributes of the data center entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 520 represents a set of capabilities and features and services offered by one or more computing systems that can be built and delivered independently, in accordance with one embodiment. A service group may be also referred to as a logical service group, a functional unit, or a bounded context. A service group 520 may also be viewed a set of services of a set of cohesive technical use-case functionalities offered by one or more computing systems. A service group 520 enforces security boundaries. A service group 520 defines a scope for modifications. Thus, any modifications to an entity, such as a capability, feature, or service offered by one or more computing systems within a service group 520 may propagate as needed or suitable to entities within the service group, but does not propagate to an entity residing outside the bounded definition of the service group 520. A data center may include multiple service groups 520. A service group definition specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a data center have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
  "service_group": [
    {
      "cells": [ ],
      "description": "Service group Service Instance Definitions",
      "service_group_id": "id1",
      "name": "name1",
      "schema_version": "1.0",
      "cluster_instances": [
        {
          "cluster_instance_name": "cluster1",
          "cluster_type": "cluster_type1"
        },
        {
          "cluster_instance_name": " cluster2",
          "cluster_type": " cluster_type1"
        },
        {
          "cluster_instance_name": " cluster3",
          "cluster_type": " cluster_type2"
        }
      ],
      "service_instances": [
        {
          "service_instance_name": "serviceinstance0001",
          "service_type": "servicetype1"
        },
        {
          "service_instance_name": "serviceinstance0002",
          "service_type": " servicetype1"
          "cluster_instance": "cluster1"
        },
        {
          "service_instance_name": "serviceinstance0003",
          "service_type": " servicetype2"
        },
        ...
      ],
      "service_teams": ["team1"],
      "type": "servicetype"
      "security_groups":[
        {
          "name":"group1",
          "policies":[
            {
              "description":"Allow access from site S1",
              "destination":{ "groups":[ "group2" ] },
              "environments":[ "dev", "test", "staging" ],
              "source":{
                "iplist":"URL1",
                "filters":[ filter-expression" ]
              }
            }
          ]
        }
      ]
    }
  ]
}
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the data center deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the data center generation module generates instructions for the cloud platform that implement specific network policies using cloud platform specific features and network functionality such that the network policies implement the security policies specified in the declarative specification.

A data center entity called a cell represents a set of services that interact with each other in a vertical fashion and can be scaled by additional instances or copies of the cell, i.e., copies of the set of services. Creating multiple instances of a cell allows a system to scale a set of services that interact with each other. A data center instance may include one or more cells. Each cell may include one or more services. A data center may include instances of service groups or cells.

A service definition specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition specifies a listening ports attribute specifying the ports that the service can listen on for different communication protocols, for example, the service may listen on a port p1 for UDP protocol and a port p2 for TCP protocol. Other services within the data center can interact with a service via the ports specified by the service.

The service definition specifies an attribute outbound access that specifies destination endpoints, for example, external URLs (uniform resource locators) specifying that the service needs access to the specified external URLs. During deployment, the data center generation module ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
"service_definition": [
    {
        "authorized_clients": [ ],
        "build_dependencies": [ ],
        "description": "description of service",
        "dns_name": "dns1",
        "documentation": "URL",
        "name": "name1",
        "namespace": "space1",
        "service_owner": "user1",
        "service_status": "GA",
        "service_team": "team1",
        "support_level": "STANDARD",
        "start_dependencies": ["svc5", "svc7", ...],
        "sub_services": [ "service1", " service2", " service3", ... ],
        "listening_ports":[
            { "protocol":"tcp", "ports":[ "53" ] },
            { "protocol":"udp","ports":[ "53" ] }
        "outbound_access":[
            {
                "destination":[
                    {
                        "endpoints":[ ".xyz.com:443", ".pqr.com:443" ]
                    }
                ]
            }
        ],
    }
]
}
```

A team definition 450 includes team member names and other attributes of a team for example, name, email, communication channel and so on. Following is an example of a team definition. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a data center and is accordingly associated with all service groups within the data center. A team association specified at a data center level provides a default team for all the service groups within the data center and further provides a default team for all services within the service groups.

According to an embodiment, a team association specified at the functional level overrides the team association provided at the data center level. Similarly, a team association specified at the service level overrides the default that may have been provided by a team association specified at the service group level or a data center level. A team can decide how certain action is taken for the data center entity associated with the team. The team associations also determine the number of accounts on the cloud platform that are created for generating the final metadata representation of the data center for a cloud platform by the compiler and for provisioning and deploying the data center on a cloud platform. The data center generation module 210 creates one or more user accounts in the cloud platform and provides access to the team members to the user accounts. Accordingly, the team members are allowed to perform specific actions associated with the data center entity associated with the team, for example, making or approving structural changes to the data center entity or maintenance of the data center entity when it is deployed including debugging and testing issues that may be identified for the data center entity.

Conventional techniques associate the same team with the data center through out the design process thereby resulting in the organizational structure having an impact on the design of the data center or service group. Embodiments decouple the team definition from the constructions that define the data center entity, thereby reducing the impact of the teams on the design and architecture of the data center entity.

```
{
    "team_definition": [
        {
            "name": "team1",
            "description": "description of team",
            "admins": [
                "user1",
                "user2",
                "user3",
                "user4",
                ...
            ],
            "team_id": "id1",
            "owner": "owner_id",
            "email": "team1@xyz.com"
        }
    ],
    "communication_channel": "channel1"
    "schema_version": "1.0"
}
```

An environment definition 460 specifies a type of system environment represented by the data center, for example, development environment, staging environment, test environment, or production environment. A schema definition 470 specifies schema that specifies syntax of specific data center entity definitions. The schema definition 470 is used for validating various data center entity definitions. The data center generation module determines security policies for the data center in the cloud platform specific metadata representation based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens) may be allowed in development environment but access tokens with much smaller life time (e.g., few hours) used in production environment. Access tokens may allow users or services with access to specific cloud platform resources.

A data center definition 420 specifies the attributes and components of a data center instance. A declarative specification may specify multiple data center instances. The data center definition 420 specifies attributes including a name, description, a type of environment, a set of service groups, teams, domain name servers for the data center, and so on. A data center definition may specify a schema definition and any metadata representation generated from the data center definition is validated against the specified schema definition. A data center includes a set of core services and capabilities that enable other services to function within the data center. An instance of a data center is deployed in a particular cloud platform and may be associated with a particular environment type, for example, development, testing, staging, production, and so on.

Following is a definition of a data center instance. The data center instance definition includes a list of service groups included in the data center instance and other attributes including an environment of the data center, a data center identifier, a name, a region representing a geographical region, one or more teams associated with the data center, and a schema version.

```
{
    "datacenter_instance": {
        "environment": "env1",
        "datacenter_instance_identifier": "id1",
        "name": "data_center1",
        "region": "region1",
        "service_groups": [
            "service_group1",
            " service_group2",
            " service_group3",
            "service_group4",
            ...
        ],
        "schema_version": "1.0",
        "admin_team":"admins",
        ...
    }
}
```

Figure 5:
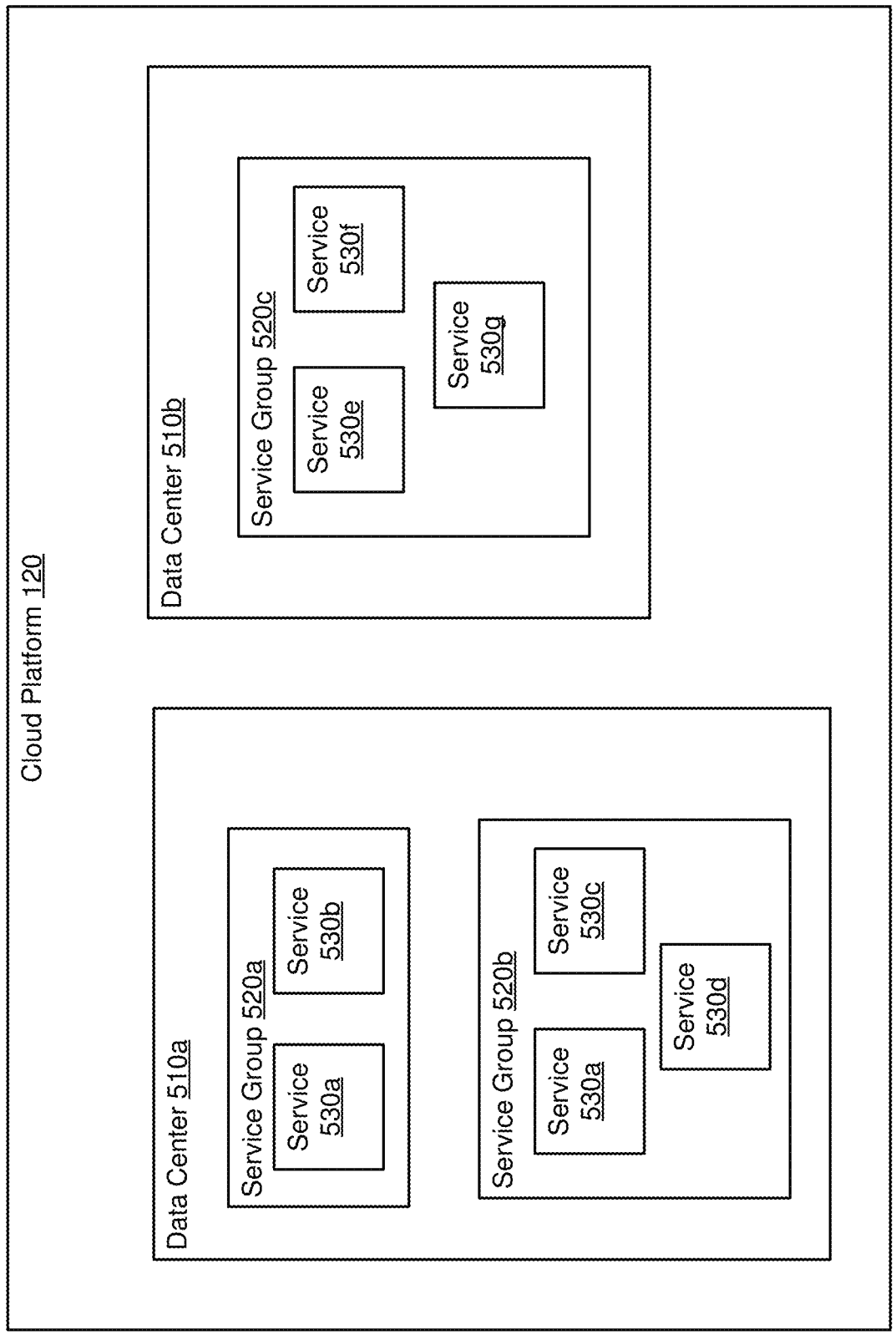
FIG. 5 illustrates example data centers created on a cloud platform based on a declarative specification according to one embodiment.

FIG. 5 illustrates some example data centers created on a cloud platform based on a declarative specification according to one embodiment. The data centers 510 may be created based on a declarative specification processed by the data center generation module 210. As shown in FIG. 5, multiple data centers may be configured within a cloud platform 120. Each data center 510 may correspond to a tenant 115 of a multi-tenant system 110. A tenant 115 may create one or more data centers 510. Alternatively, a data center 510 may be created by any computing system. Each data center includes one or more service groups. For example, data center 510a includes service groups 520a and 520b and data center 510b includes service group 520c. A data center may include multiple instances of a particular type of service group. Each service group includes a set of services. For example, service group 520a includes services 530a and 530b, service group 520b includes services 530a, 530b, and 530c, and service group 520c includes services 530e, 530f, and 530g. A service group may include multiple instances of services of the same service type.

The datacenter generation module 220 creates data centers on cloud platforms based on a declarative specification using the following steps. The data center generation module 210 receives a cloud platform independent declarative specification of a data center. The cloud platform independent declarative specification may be for a tenant of the multi-tenant system or for any other computing system, for example, an online system. The cloud platform independent declarative specification is specified using the cloud platform infrastructure language. The cloud platform independent declarative specification of the data center is configured to generate the data center on any of a plurality of cloud platforms.

The data center generation module 210 receives information identifying a target cloud platform for creating the data center based on the cloud platform independent declarative specification. The target cloud platform could be any of a plurality of cloud platforms, for example, AWS, AZURE, GCP, and so on. The data center generation module 210 further receives information to connect with the target cloud platform, for example, credentials for creating a connection with the target cloud platform. A cloud platform may also be referred to as a cloud computing platform.

The data center generation module 210 compiles the cloud platform independent declarative specification to generate a cloud platform specific data center representation for creating the data center on the target cloud computing platform. For example, the cloud platform specific data center representation may refer to user accounts, network addresses, and so on that are specific to the target cloud computing platform.

The data center generation module 210 sends the platform specific data center representation along with instructions for deploying the data center on the target cloud computing platform. The target cloud computing platform executes the instructions to configure the computing resources of the target cloud computing platform to generate the data center according to the platform specific data center representation. The data center generation module 210 provides users with access to the computing resources of the data center configured by the cloud computing platform. For example, if the data center was created for a tenant of the multi-tenant system, users associated with the tenant are provided with access to the data center.

Figure 6:
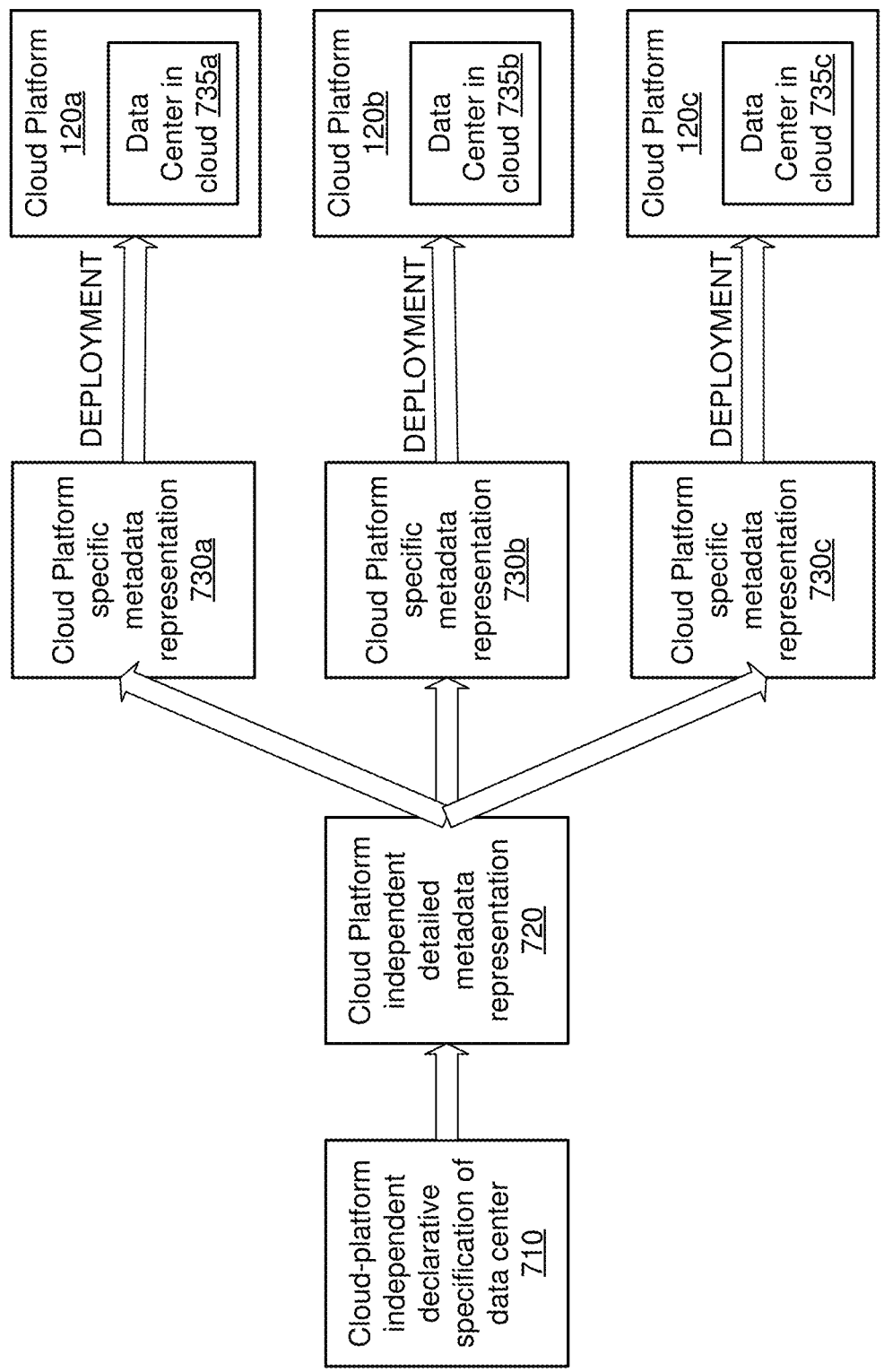
FIG. 6 is a block diagram illustrating generation of data centers on cloud platforms based on a declarative specification, according to one embodiment.

FIG. 6 is a block diagram illustrating generation of data centers on cloud platforms based on a declarative specification, according to one embodiment. The data center generation module 210 receives as input a cloud-platform independent declarative specification 610. The cloud-platform independent declarative specification 610 may be a version of the declarative specification that is being incrementally modified by users. The data center generation module 210 processes a particular version of the cloud-platform independent declarative specification 610. Since cloud-platform independent declarative specification 610 is not specified for any specific target cloud platform, the data center generation module 210 can configure a data center on any target cloud platform based on the cloud-platform independent declarative specification 610.

The data center generation module 210 processes the cloud-platform independent declarative specification 610 to generate a cloud-platform independent detailed metadata representation 620 for the data center. The cloud-platform independent detailed metadata representation 620 defines details of each instance of data center entity specified in the cloud-platform independent declarative specification 610. The data center generation module 210 creates unique identifiers for data center entity instances, for example, service instances.

In an embodiment, the cloud-platform independent detailed metadata representation 620 includes an array of instances of data center entity types, for example, an array of service group instances of a particular service group type. Each service group instance includes an array of service instances. A service instance may further include the details of a team of users that are allowed to perform certain actions associated with the service instance. The details of the team are used during provisioning and deployment by the data center generation module 210, for example, for creating a user account for the service instance and allowing members of the team to access the user account.

The cloud-platform independent detailed metadata representation 620 includes attributes of each instance of data center entity. Accordingly, the description of each instance of data center entity is expanded to include all details. As a result, the cloud-platform independent detailed metadata representation 620 of a data center may be significantly larger than the cloud-platform independent declarative specification 610. For example, the cloud-platform independent declarative specification 610 may be few thousand lines of specification, whereas the cloud-platform independent detailed data center representation 620 may be millions of lines of generated code. As a result, the data center generation module 210 keeps the cloud-platform independent detailed metadata representation 620 as immutable, i.e., once the representation is finalized, no modifications are performed to the representation. For example, if any updates, deletes, or additions of data center entities need to be performed, they are performed on the cloud platform independent declarative specification 610.

The data center generation module 210 receives a target cloud platform on which the data center is expected to be provisioned and deployed and generates a cloud platform specific detailed metadata representation 630 of the data center. For example, the data center generation module 210 interacts with the target cloud platform to generate certain entities (or resources), for example, user accounts, virtual private clouds (VPCs), and networking resources such as subnets on the VPCs, various connections between entities in the cloud platform, and so on. The data center generation module 210 receives resource identifiers of resources that are created in the target cloud platform, for example, user account names, VPC IDs, and so on, and incorporates these in the cloud-platform independent detailed metadata representation 620 to obtain the cloud platform specific metadata representation 630 of the data center. In an embodiment, the data center generation module 210 creates one unique user account on the cloud platform for each team for a given combination of a service group and a service. The user account is used by the team for performing interactions with that particular service for that service group, for example, for debugging, for receiving alerts, and so on.

The target cloud platform may perform several steps to process the cloud-platform specific detailed metadata representation 630. For example, the cloud platform independent declarative specification may specify permitted interactions between services. These permitted interactions are specified in the cloud-platform specific detailed metadata representation 630 and implemented as network policies of the cloud platform. The cloud platform may further create security groups to implement network strategies to implement the data center according to the declarative specification.

The cloud platform independent declarative specification specifies dependencies between services, for example, start dependencies for each service listing all services that should be running when a particular service is started. The data center generation module 220 generates the cloud platform specific detailed metadata representation of the data center that includes information describing these dependencies such that the instructions for deploying the service ensure that the cloud platform starts the services in an order specified by the dependencies such that for each service, the services required to be started before the service are running when the service is started. Accordingly, the dependencies between services represent a dependency graph and the cloud platform starts running the services in an order determined based on the dependency graph such that if service A depends on service B, the service B is started before service A is started.

The data center generation module 220 creates trust relationships between user accounts that allow services to access other services via secure communication channels. These trust relationships are generated using substrate specific instructions generated based on the declarative specification, for example, based on outbound access attributes specified for services. The data center generation module 220 sends instructions to the cloud platform to create network policies based on cloud platform specific mechanisms that control the interactions and access across service groups and services, for example, as specified by the constructs of the declarative specification such as outbound access, security groups, security policies and so on.

The data center generation module 210 deploys the cloud platform specific metadata representation 630 on the specific target cloud platform for which the representation was generated. The data center generation module 210 may perform various validations using the generated metadata representations, including policy validations, format validations, and so on.

The cloud platform independent declarative specification 610 may be referred to as a declared data center representation, cloud-platform independent detailed metadata representation 620 referred to as a derived metadata representation of the data center, and cloud platform specific metadata representation 630 referred to as a hydrated metadata representation of the data center.

Overall Process for Deployment of Software Artifacts on a Datacenter

Figure 7:
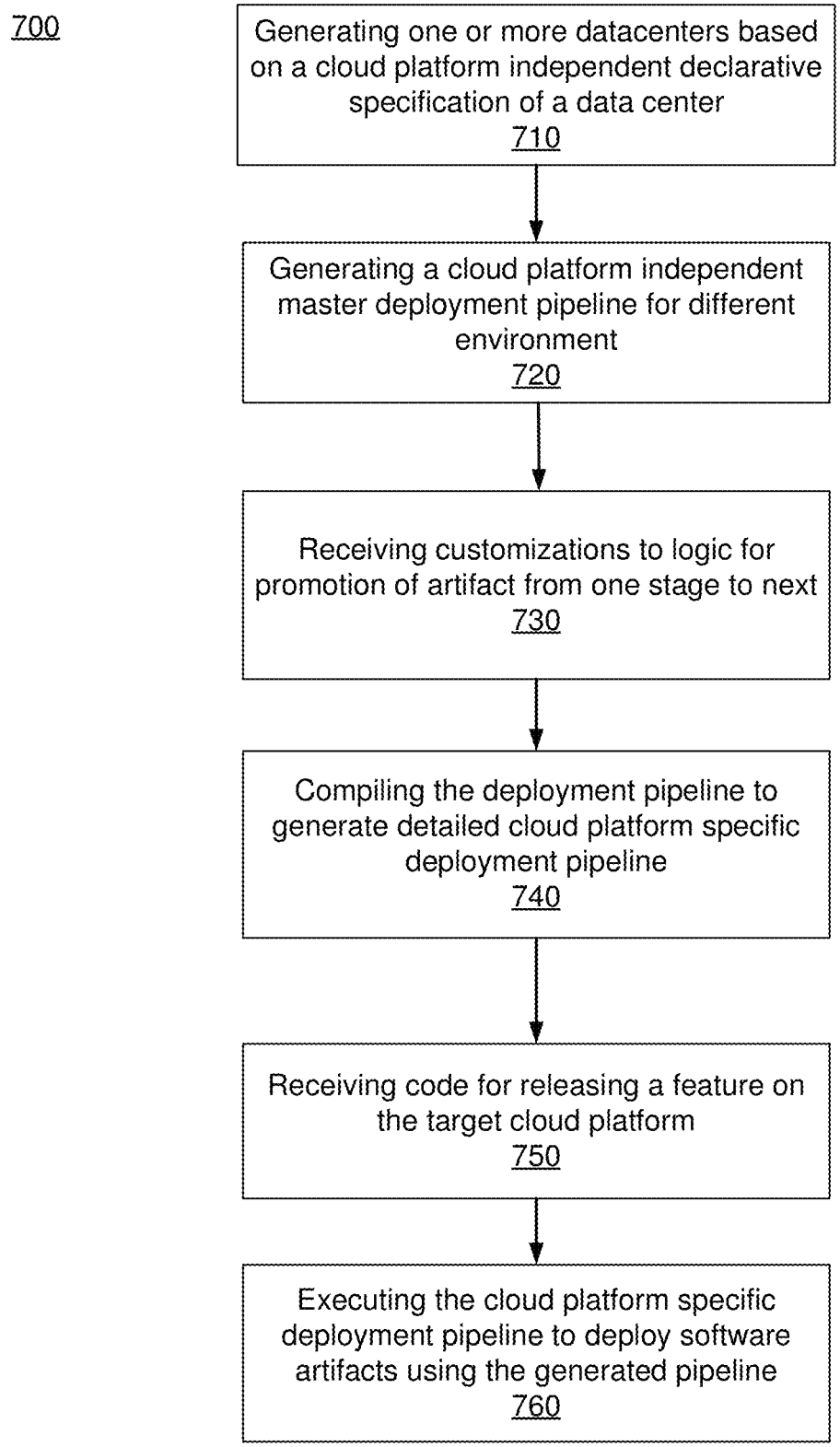
FIG. 7 shows the overall process for generating pipelines for deployment of software artifacts on datacenters configured on a cloud platform according to an embodiment.

FIG. 7 shows the overall process for generating pipelines for deployment of software artifacts on datacenters configured on a cloud platform according to an embodiment. The datacenter generation module generates 710 one or more datacenters on a target cloud platform. Each datacenter is generated from a cloud platform independent declarative specification and has a hierarchy of datacenter entities.

The software release management module 230 generates 720 a cloud platform independent master pipeline. In an embodiment, the cloud platform independent master pipeline includes stages corresponding to environments of the datacenters, for example, development environment, test environment, canary environment, and production environment. The master pipeline composes a sequence of progressive and/or conditional deployment across various environments such as development environment, test environment, staging environment, or production environment. The master pipeline may be triggered by delivery of the image for a software artifact and includes stages or instructions to deploy the build in environments of type development. The software artifact that is built is conditionally promoted to one or more test environments, followed by one or more canary environments before eventually getting deployed to production environments. The master pipeline may be customized by users, for example, service owners to represent a specific orchestration across environments. The master pipeline may be customized to capture specific promotion criteria for moving from one stage to next. For example, different tenants of the multi-tenant system may customize the master pipeline in a different manner. In an embodiment, the master pipeline by default uses the latest version of software for a software artifact for a service and builds and deploys the version across various environments. The user can use the artifact version map to ensure that a specific version of a software artifact is deployed on specific datacenter entities.

In an embodiment, each service deployed in the datacenter has a cloud platform independent master pipeline generated from the datacenter entities as defined by the declarative specification of the datacenter, for example, master pipeline for datacenter instances, master pipeline for service groups, master pipeline for cells, master pipeline for services, and so on. The master pipelines may be triggered on delivery of images of software artifacts. The master pipelines may implement a service owner-controlled continuous deployment. The master pipelines may implement datacenter instance owner-owned or release owner-owned on-demand deployment.

Certain portions of the master pipeline may be customized by the users, for example, by tenants of a multi-tenant system that are deploying services on a datacenter. For example, the promotion decision pipeline may be customized by a tenant to determine which test cases are executed and what threshold is The software release management module 230 receives 730 customizations to logic for promoting a software artifact from one stage to another stage of the cloud platform independent master pipeline.

The software release management module 230 compiles 740 the cloud platform independent master pipeline to generate a cloud platform specific detailed deployment pipeline that is specific to the hierarchy of datacenter entities of each datacenter as specified by the cloud platform independent declarative specification for the datacenter.

The software release management module 230 further receives 750 code for releasing one or more features of services deployed on the datacenter. The software release management module 230 executes 760 the cloud platform specific detailed deployment pipeline to deploy software artifacts based on the received code.

Figure 8:
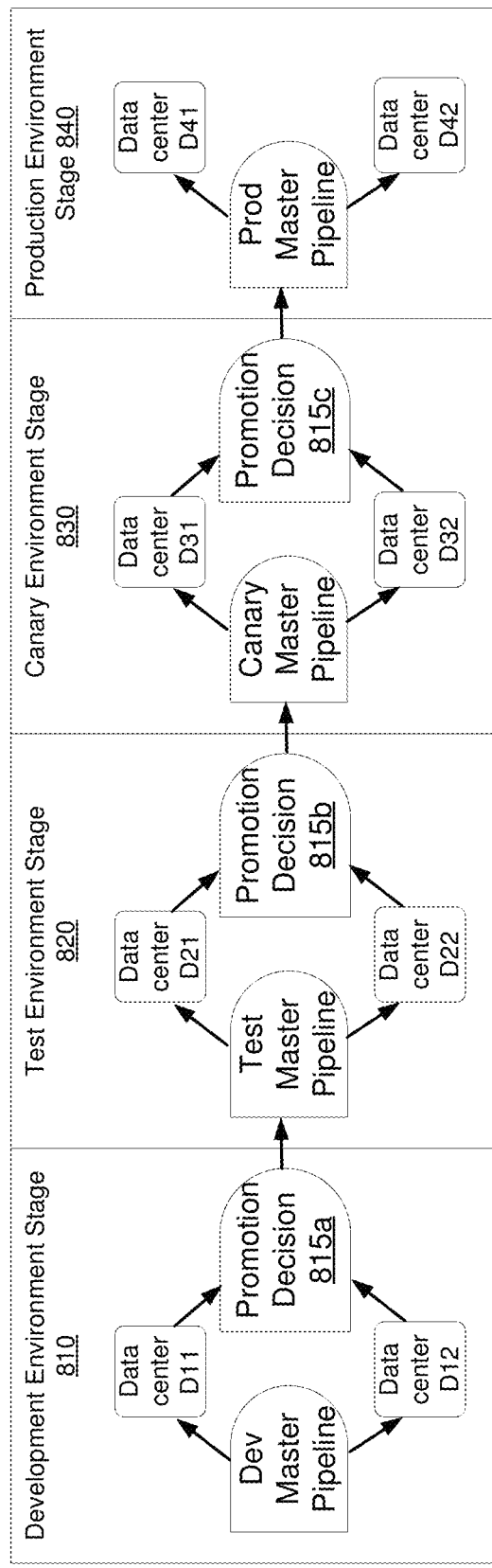
FIG. 8 illustrates an example master pipeline according to an embodiment.

FIG. 8 illustrates an example master pipeline 800 according to an embodiment. A master pipeline represents a sequence of stages that represent progressive conditional deployment across various datacenter environments. FIG. 8 shows stages for different environments of datacenter including development environment, test environment, canary environment, and production environment. Each stage further represents a pipeline that is executed for that stage. Accordingly, the master pipeline 800 includes a development environment pipeline 810 which feeds into a test environment pipeline 820, which feeds into a canary environment pipeline 830, which feeds into production environment pipeline 840.

The pipeline at each stage is a hierarchical pipeline comprising lower level pipelines. For example, the development environment pipeline 810 comprises a development master pipeline that feeds into datacenter pipelines D11, D12, . . . , depending on the number of datacenters specified as having development environment in the declarative specification of the datacenters.

The test environment pipeline 820 comprises a test master pipeline that feeds into datacenter pipelines D21, D22, . . . , depending on the number of datacenters specified as having test environment in the declarative specification of the datacenters.

The canary environment pipeline 820 comprises a canary master pipeline that feeds into datacenter pipelines D31, D32, . . . , depending on the number of datacenters specified as having canary environment in the declarative specification of the datacenters.

The production environment pipeline 820 comprises a production master pipeline that feeds into datacenter pipelines D21, D22, . . . , depending on the number of datacenters specified as having test environment in the declarative specification of the datacenters.

Each environment pipeline 810, 820, 830 includes a promotion decision pipeline 815a, 815b, 815c respectively. The outputs of the datacenter pipelines of the environment pipeline are collected by the promotion decision pipeline 815 that determines whether the software artifact is ready for promotion to the next stage. The promotion decision pipeline 815 may determine based on test case results obtained by the datacenters whether the software artifact for the service is promoted to the next stage. For example, if more than a threshold test cases are passed, the promotion decision pipeline 815 promotes the software artifact to the next stage. The last environment stage, for example, the production environment pipeline may not have a promotion decision pipeline since there is no subsequent stage to which the software artifact needs to be promoted. As shown in FIG. 8, the promotion decision pipeline 815a of development environment pipeline determines whether to promote the software artifact from development stage to test stage; the promotion decision pipeline 815b of test environment pipeline determines whether to promote the software artifact from test stage to canary stage, and the promotion decision pipeline 815c of canary environment pipeline determines whether to promote the software artifact from canary stage to production stage.

A master pipeline comprises multiple pipelines, for example, a provisioning pipeline for provisioning resources of the target cloud platform and a deployment pipeline for deploying a software artifact on a data center entity. Each pipeline comprises a sequence of stages, each stage representing one or more actions that need to be performed by the target cloud platform towards provisioning and deploying of the data center. The data center generation module 210 generates detailed pipelines for deploying versions of software artifacts on datacenter entities.

In an embodiment, the pipeline generator module 320 generates detailed pipelines using pipeline templates that include variables. A pipeline template is converted into a pipeline by providing specific values of the variables in the pipeline. The process of generating a pipeline from a template is referred to as hydration of the pipeline template. A pipeline template contains templating expressions used as placeholders for actual values used in the deployment. For example, a templating expression may be replaced by target specific parameter values or expressions. Multiple pipeline instances may be generated by hydrating the pipeline template for different targets. The template variables represent parameters that may be replaced with specific values for a given target to generate a pipeline instance specific to that target. For example, a template variable "account_id" may be replaced with an actual value of account_id, for example, "12345" during hydration.

In one embodiment, the pipeline generator module 320 generates pipelines in a hierarchical fashion based on the hierarchy of the data center entities of the data center. For example, the data center comprises data center entities of different types including data centers, service groups, services, and so on. A data center entity may include one or more child data center entities. For example, a data center includes one or more service groups as child data center entities. A service group includes one or more services as child data center entities. Accordingly, the data center generation module 210 starts at a data center entity at a level of the hierarchy and generates pipelines of data center entities below that level. For example, the pipeline generator module 320 starts at the data center level and generates pipelines for service groups within the data center. For each service group, the pipeline generator module 320 generates pipelines for services within the service group.

The process for executing pipelines according to one embodiment is as follows. The software release deployment module 230 receives a request to deploy a software artifact on a set of data center entities in the target cloud platform. The software release deployment module 230 executes the master pipeline for one or more datacenters. The software release deployment module 230 executes the aggregate pipelines for each service group of each datacenter. The aggregate pipeline comprises pipelines for services within the service group. For each service within each service group, the pipeline is executed by executing all the stages of the pipeline. The execution of the provisioning pipelines results in provisioning of the resource for a service and the deployment pipeline causes deployment of the service in the target cloud platform.

Figure 9:
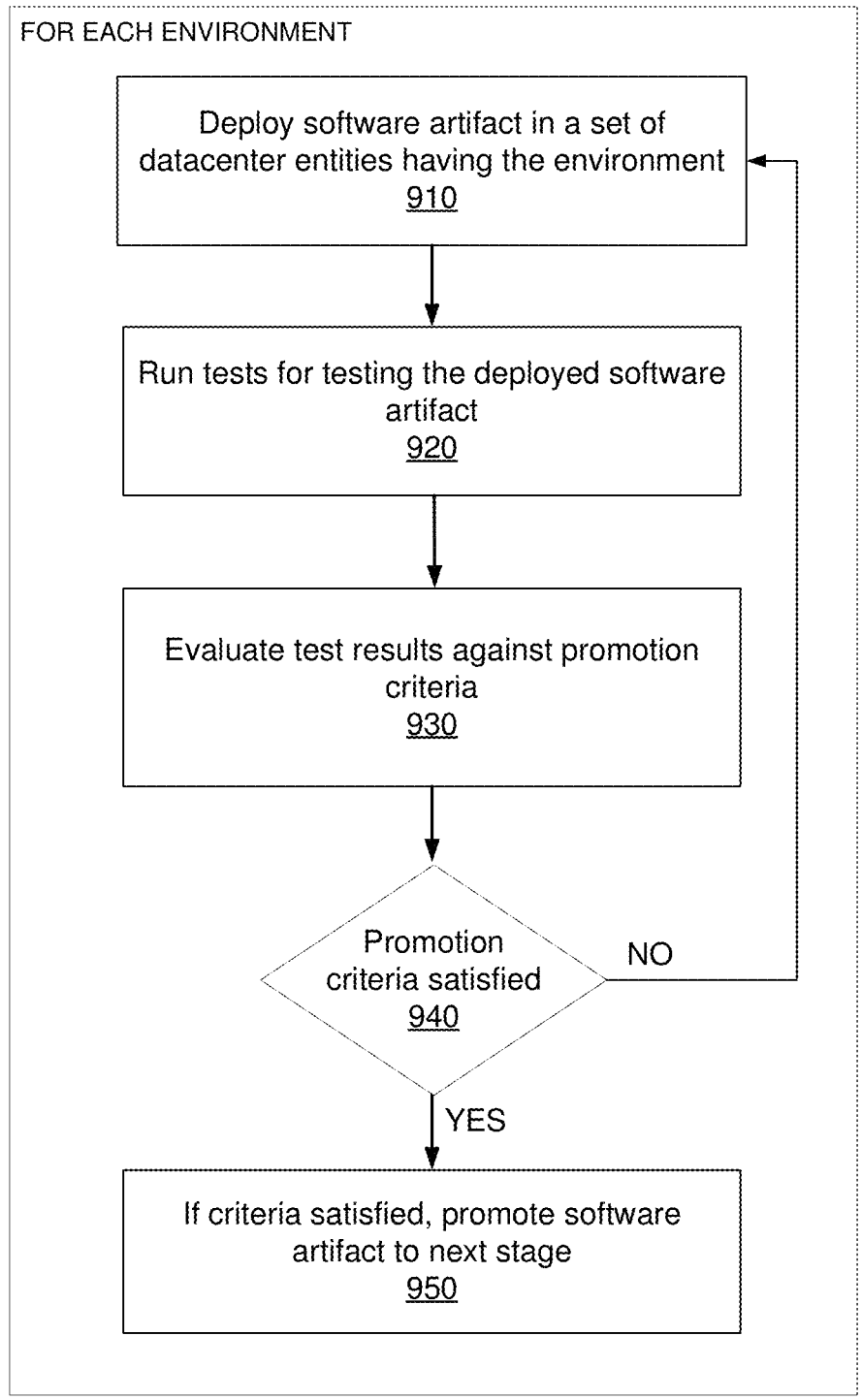
FIG. 9 shows the overall process executed by a stage for an environment of the master pipeline on a cloud platform according to an embodiment.

FIG. 9 shows the overall process executed by a stage for an environment of the master pipeline on a cloud platform according to an embodiment. The steps 910, 920, 930, 940, and 950 may be performed by each environment pipeline 810, 820, 830. The production environment pipeline 3 may execute only steps 910 and 920. The steps shown in FIG. 9 may be performed for one service or for multiple services specified using a manifest file.

The environment pipeline for an environment E includes instructions to deploy 910 the software on a set of datacenter entities, for example, a set of datacenter entities specified as having the environment E. In an embodiment, the software artifact is generated by compiling source code for a service. The source code may be obtained from a version control software. The set of datacenter entities may include datacenter instances, service groups, cells, services, or any combination of these.

The environment pipeline for the environment E further includes instructions for running 920 tests for testing the deployed software artifact on the set of datacenter entities. The environment pipeline for the environment E further includes instructions for evaluating 930 the test results against promotion criteria, for example, using the promotion decision pipeline 815. If the promotion criteria are not satisfied, the steps 910, 920, 930, and 940 may be repeated using a revised software artifact, for example, a software artifact generated from source code that includes fixes for certain defects identified during the testing 920. The environment pipeline for the environment E further includes instructions for proceeding 950 to the next stage if the promotion criteria are satisfied.

In an embodiment, the master pipeline comprises a hierarchy of pipelines. The hierarchy comprises multiple levels and pipelines at a particular level include pipelines of the next lower level as children pipelines. For example, at the highest level of hierarchy the master pipeline includes a release master pipeline that deploys a set of services related to a product. The next level of hierarchy includes service master pipelines that represent al deployments of a particular service across various environments. The next level of hierarchy may include service group master pipelines followed by service master pipelines.

Figure 10:
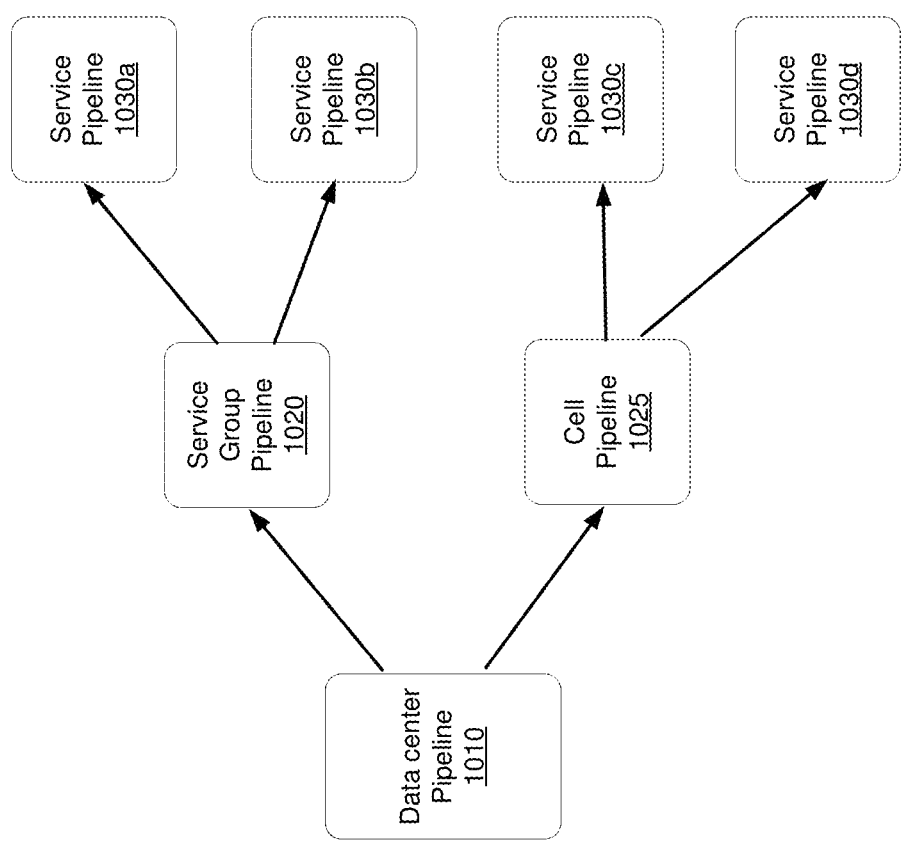
FIG. 10 shows an example master pipeline according to an embodiment.

FIG. 10 shows an example master pipeline according to an embodiment. The master pipeline is a hierarchical pipeline where each stage of a pipeline may comprise a pipeline with detailed instructions for executing the stage. The master pipeline hierarchy may mirror the datacenter hierarchy. For example, the top level of the master pipeline represents a sequence of stages for different environments. Each environment may include one or more pipelines for datacenter instances or pipelines for other types of datacenter entities. A datacenter instance pipeline 1010 may include service group pipelines 1020. Each service group pipeline 1020 may include one or more service pipelines 1030. A datacenter instance pipeline 1010 may include cell pipelines 1025, each cell pipeline 1025 comprising one or more service pipelines 1030. The service pipeline 1030 may comprise stages, each stage representing a pipeline representing instructions for deploying the service for specific environments. The lowest level pipeline or the leaf level pipeline in the hierarchy is referred to as a unit pipeline and may include detailed service specific instructions for performing an operation related to a service. For example, deployment for a service may include pre-deployment steps, deployment steps, post deployment steps, and post deployment test and validation step. A pipeline that is not a leaf level pipeline and has one or more child pipeline is an aggregate pipeline that orchestrates executions of the child pipelines.

A master pipeline may be driven by pull requests that occur a version control system for software receives a request for considering changes committed to an external repository for inclusion in a project's main repository. Accordingly, the master pipeline is automatically triggered when a pull request is received and deploys a software artifact based on the latest software version for which the pull request is received. The master pipeline performs continuous delivery of software artifacts based on pull requests. The master pipeline may be driven based on an on-demand manner, for example, by invoking a request using application programming interface (API) of the deployment module 210. The on-demand deployment based on master pipelines may be requested for any set of services and for any version for a given service as specified using the API. The master pipeline may be invoked to request a rollback from the current version to a previous version or a rollforward from the currently deployed version to a more recent version.

In an embodiment, the deployment module 210 creates a service master pipeline for each service. These pipelines get triggered when a pull request is received for a repository of the software. The deployment module 210 receives pipeline templates from users for specific services. These pipeline templates include detailed instructions for testing, validation, build, etc. for specific services. The datacenter generation module 220 receives a cloud platform independent declarative specifications for one or more datacenters. The datacenter generation module 220 generates (or configures) datacenters according to the received cloud platform independent declarative specifications. The deployment module 210 receives promotion decision 815 pipelines. The promotion decision 815 pipelines are integrated into the overall master pipeline.

The pipeline generator creates all pipelines for each datacenter from the templates and combines them via master pipelines in a hierarchical fashion, for example, as illustrated in FIG. 10. In an embodiment, the pipeline generator generates service pipelines for individual services; the pipeline generator generates cell master pipelines to invoke the service pipelines; the pipeline generator generates service group master pipelines to invoke cell master pipelines; the pipeline generator generates datacenter instance master pipelines to invoke service group pipelines; the pipeline generator generates a service master pipeline to invoke the datacenter instance master pipelines.

Following is a snippet of a master pipeline showing various stages. Each stage may specify attributes including a stage name, a type of pipeline, a stage type (e.g., master deployment pipeline or promotion pipeline), prior stages, and so on.

```
{
"stages": [
  {
    "stage_name": "Artifact version map for service SVC",
    "stage_type": "version_map",
    "prior_stage_ids": [ ]
  },
  {
    "pipeline_type": "env-type-aggregate",
    "template_name": "deploy_dev.j2",
    "stage_name": "Deploy to dev env",
    "stage_type": "master_deployment_pipeline",
    "prior_stage_ids": [      " Artifact version map for service SVC" ]
  },
  {
    "promote_to": "test",
    "template_name": "promote.j2",
    "pipeline_type": "promotion",
    "stage_name": "Promote to test env",
    "stage_type": "promotion",
    "prior_stage_ids": [      "Deploy to dev env" ]
  },
  {
    "pipeline_type": "env-type-aggregate",
    "template_name": "deploy _test.j2",
    "stage_name": "Deploy to test env",
    "stage type": "master_deployment_pipeline",
    "prior_stage_ids": [      "Promote to test env" ]
  },
  {
    "promote_to": "stage",
    "template_name": "promote.j2",
    "pipeline_type": "promotion",
    "stage_name": "Promote to staging env",
    "stage_type": "promotion",
    "prior_stage_ids": [      "Deploy to test env" ]
  },
  {
    "promote_to": "stage",
    "template_name": "promote.j2",
    "pipeline_type": "promotion",
    "stage_name": "Promote to staging env",
    "stage_type": "promotion",
    "prior_stage_ids": [      "Deploy to test env" ]
  } ...
```

As shown in the examiner master pipeline, the first stage is an artifact version map. The next stage is a master deployment pipeline for deploying to development environment. The next stage is a promotion pipeline for determining whether the software artifact can be promoted to the next stage. The next stage is a master deployment pipeline for deploying to test environment. The next stage is a promotion pipeline for determining whether the software artifact can be promoted to the next stage that is staging environment.

Software Artifact Version Map

In an embodiment, the deployment module 210 receives an artifact version map that associates various software artifacts and their versions with datacenter entities. The artifact version map provides a declarative specification of the specific versions of software artifacts that need to be deployed for services in different datacenter entities. Each datacenter entity may be uniquely identified based on its location within the datacenter hierarchy as specified by the declarative specification of the datacenter. For example, for a service, a software library may act as a software artifact. The software artifact may have multiple versions, for example, V1, V2, V3, and so on. The artifact version map may specify that version V1 needs to be deployed in datacenter entities C1 and C2 and version V2 needs to be deployed in datacenter entities C3 and C4. The deployment module 210 generates master pipelines and instructions that ensure that the appropriate software artifact versions are deployed in the datacenter entities as specified in the artifact version map.

In an embodiment, the artifact version map is specified as a JSON (Javascript object notation) file, a YAML file, or a file using any other syntax for representing nested objects. The artifact version map may comprise a set of <service>: <version> key pairs that are associated with various datacenter entities distributed across a hierarchy of a datacenter. The artifact version map key pairs act as whitelists for corresponding pipelines. If a key for a service is not included into an artifact version map, all pipelines for that service are excluded during execution of the pipeline. Different artifact version maps may be applied to the same master pipeline resulting in different services being included/excluded during execution of the master pipeline.

Following is an example artifact version map. The artifact version map specifies environment types using the attribute "env_types". In the following example, the environment type development is specified. The environment type may include one or more datacenter instances; a datacenter instance may include one or more service groups, a service group may include one or more services. In the following example, the software artifact name is specified as library1 and version as version1 and is associated with the service instance instance001. However, the software artifact name and version may be associated with any level of datacenter entity in the hierarchy. For example, of the software artifact name and version is specified or a service group, the software artifact name and version is applicable to all services within the service group unless the software artifact name and version is overridden with different values of the software artifact name and version specified for a particular service instance within the service group. Similarly, the software artifact name and version can be specified for a datacenter instance and is applicable to all service groups or cells within the datacenter instance unless an overriding value is specified for a service group.

```
{
  "name": "artifact_version_map1",
  "schema version": "0.1",
  "release_label": "release1.1",
  "deployments": {
    "env_types": [
      {
        "name": "development",
```

-continued

```
        "datacenter_instances": [
          {
            "name": "datacenter1",
            "service_group": [
              {
                "name": "service_group1",
                "services": [
                  {
                    "service_instance": "instance001",
                    "name": "service1",
                    "versions": [
                      {
                        "software_artifact_name": "library1",
                        "version": "version1"
                      }
                    ]
                  }
                ]
              }
            ]
          }
        ],
      }
    }
}
```

In an embodiment, the artifact version map specifies a datacenter entity using a full path of the datacenter entity, for example, "stagger_group1/datacenter1/service group2/service1". In an embodiment, the artifact version map specifies a set of datacenter entities using regular expressions in the full path of the datacenter entity. For example, a full path that includes service group[?] includes service_group1, service_group2, service_group3, and so on.

Following is an example of an artifact version map specifying regular expressions to define a set of services. The environment types are specified as dev and test and the datacenter entities in the full path including datacenter instances and service groups are specified as wildcards and service instances are specified as "service*". Accordingly, for all datacenter instances for dev and test environments, for all service groups, for services names matching service*, the version V1 of application app1 will be deployed.

```
env_types:
  - name: "dev|test"
    datacenter_instances:
      - name: "(.*)"
        service_group:
          - name: "(.*)"
            services:
              - service_instance: "service*"
                name: "app1"
                versions:
                  version: "V1"
```

In some embodiments, the artifact version map may specify parameters used by pipelines. Accordingly, the specified parameters will be applicable to a stagger group for which the parameter is specified.

The following process is used for deployment of software artifacts on datacenters configured on a cloud platform according to an embodiment. The datacenter generation module generates one or more datacenters on a target cloud platform. Each datacenter is generated from a cloud platform independent declarative specification and has a hierarchy of datacenter entities.

The software release management module 230 receives as input, an artifact version map that maps datacenter entities to versions of software artifacts. The software release management module 230 also receives as input, a cloud platform independent master pipeline.

The software release management module 230 compiles the cloud platform independent master pipeline in conjunction with the artifact version map to generate a cloud platform specific detailed pipeline. In an embodiment, the generated cloud platform specific detailed pipeline includes artifact version map filters before certain stages to determine whether certain stages should be enabled or disabled according to the artifact version map.

The software release management module 230 further receives code for releasing one or more features of services deployed on the datacenter. For example, the code may represent source code obtained from a version control management system storing source code repositories to which changes are submitted by developers. The software release management module 230 executes the cloud platform specific deployment pipeline to deploy software artifacts based on the received code.

The artifact version map and master pipelines can be used to orchestrate various types of operations related to continuous delivery of software artifacts in a cloud-based datacenter. The artifact version map and the master pipelines can be configured to perform aggregate retry operations for a service or a service group or any datacenter entity. The artifact version map includes configurations of retry operations for a datacenter entity, including the retry strategy, a threshold number of retries to perform in case of failure to execute a stage of a pipeline, whether confirmation from a user is required before retrying or retry is performed automatically, and so on. For example, a retry strategy may be a fixed backoff strategy that pauses execution for a fixed period of time before retrying. Other retry strategies may be configured using artifact version map and master pipelines. In an embodiment, the pipeline generator introduces a retrier stage within an aggregate pipeline to trigger a retry strategy if a previous pipeline stage fails. The retry strategy and configuration parameters specified for a datacenter entity applies to all datacenter entities and services within the datacenter entity unless the value is overridden for a nested datacenter entity.

Pipeline Generation

In an embodiment, the software release management module 230 receives metadata describing a datacenter configured to execute a set of services on a cloud platform. The software release management module 230 receives a plurality of pipeline templates. A pipeline template comprises (1) instructions to perform a set of actions associated with releasing a software artifact on the cloud platform, (2) one or more templating expressions representing placeholders for values, and (3) one or more templating expressions representing references to pipelines.

The pipeline generator module 320 generates a plurality of partially hydrated pipeline templates from the plurality of pipeline templates. A partially hydrated pipeline template is generated by substituting one or more templating expressions of a pipeline template with actual values obtained from metadata describing the datacenter. The pipeline generator module 320 generates a first set of pipelines from the plurality of partially hydrated pipeline templates. A pipeline is generated from the partially hydrated pipeline template by substituting one or more templating expressions representing links with corresponding pipeline identifiers.

If there is a change in metadata describing the datacenter, the pipeline generator module 320 regenerates a partially hydrated pipeline template and generates a second set of pipelines from the plurality of partially hydrated pipeline templates. The second set of pipelines includes the regenerated partially hydrated pipeline template and one or more partially hydrated templates generated before the change in metadata. This mechanism allows the system to reuse the partially hydrated pipeline templates repeatedly when there are changes in metadata or other changes that trigger generating of a subset of pipelines using the pipeline templates.

System Architecture of Pipeline Generator Module

Figure 11:
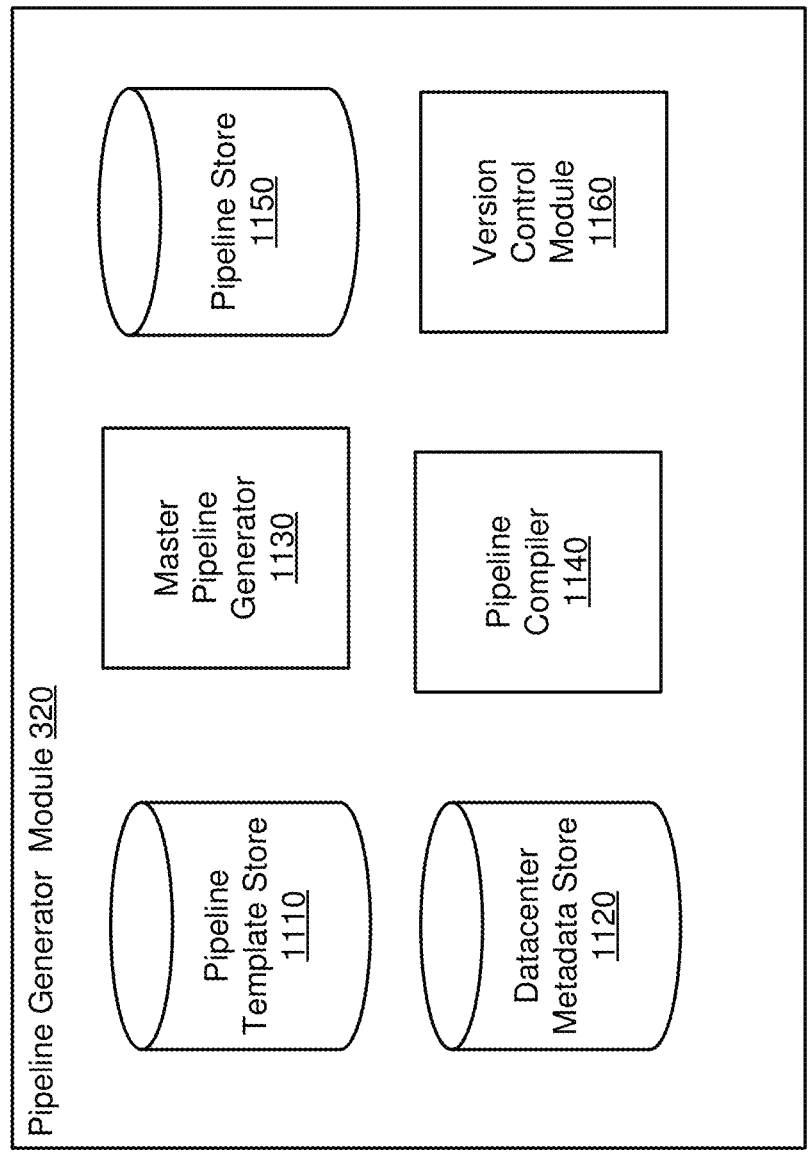
FIG. 11 shows the system architecture of a pipeline generator module according to an embodiment.

FIG. 11 shows the system architecture of a pipeline generator module according to an embodiment. The pipeline generator module 320 comprises a pipeline template store 1110, a datacenter metadata store 1120, a master pipeline generator 1130, a pipeline compiler 1140, a version control module 1160, and a pipeline store 1150. Other embodiments may include more or fewer components than those indicated herein in FIG. 11.

The datacenter metadata store 1120 stores metadata describing datacenters. The metadata describing the datacenters is obtained from the declarative specification used for configuring the datacenter in a target cloud platform. The metadata describing a datacenter includes various datacenter entities of the datacenter as well as the relations between the datacenter entities that describes the hierarchy of datacenter entities of a datacenter. The metadata describing a datacenter includes attributes defined for each datacenter entity, for example, name of the datacenter entity, a version of the datacenter entity, a identifier of the datacenter entity, a team of users or specific users associated with the datacenter entity, and so on.

The master pipeline generator 1130 generates master pipelines from metadata describing datacenter configurations and artifact version maps. An example of master pipeline is shown in FIG. 8. The master pipeline defines the overall stages for orchestrating software releases across one or more datacenters for a given artifact version map.

The pipeline compiler 1140 compiles a master pipeline to generate executable pipelines which are provided to pipeline execution engines 360 for execution. The pipeline compiler generates datacenter pipelines 1010, service group pipelines 1020, cell pipelines 1025, and service pipelines 1030 from the master pipeline as shown in FIG. 10. The pipelines datacenter pipelines 1010, service group pipelines 1020, cell pipelines 1025 are referred to as aggregate pipelines since they represent groups of lower level pipelines such as service pipelines. A service pipeline is generated from pipeline templates that may be provided by users, for example, users associated with a tenant of a multi-tenant system. The pipeline compiler 1140 may receive pipeline templates comprising templating expressions and generate pipelines from the pipeline templates. Users, for example, service owners provide pipeline templates that can be used to generate different pipelines, for example, for different contexts such as different configuration parameters or different instances of datacenter entities.

The pipeline template store 1110 stores pipeline templates used for generating pipelines. A pipeline template may be associated with specific types of services. The pipeline template is used for generating a service pipeline 1030 as shown in FIG. 10. A pipeline template includes instructions for performing specific tasks, for example, modifying configuration of a service or resource, compiling a software artifact, running test cases, deploying a software artifact, and so on. A pipeline template includes templating expressions that need to be substituted with values. The pipeline generator module 320 substitutes all templating expressions of a pipeline template to obtain a pipeline that is sent for execution by a pipeline execution engine 360. A pipeline template may include links to other pipelines or pipeline templates.

A pipeline template contains templating expressions used as placeholders for actual values used in the deployment. For example, a templating expression may be replaced by target specific parameter values or expressions. Multiple pipeline instances may be generated by hydrating the pipeline template for different targets. The process of generating a pipeline from a template is referred to as hydration of the pipeline template. A pipeline may be represented using a particular data format, for example, JavaScript Object Notation (JSON) format, extensible markup language (XML) format, or YAML format.

A template includes templating expressions that may represent expressions of template variables. A templating expression is identified within the template using markers so that the templating expressions can be identified by a script. The markers include a begin marker, for example, "{{" that identifies the start of the templating expression and an end marker "}}" that identifies the end of the templating expression. The beginning marker and the ending markers can be special characters or sequences of special characters that are not expected to occur in the template except in connections with a templating expression for identifying the templating expression. A templating expression may be a template variable.

Following is an example of a template corresponding to the example pipeline above.

```
"clusters": [
  {
     "account": {{ vars.target.account.name }},
     "availabilityZones": {
        {{ vars.target.region }}:
           {{ vars.target.availability_zones }}
     },
     ...
  },
],
```

The templating expressions represent parameters that may be replaced with specific values for a given target to generate a pipeline instance specific to that target. For example, a template variable "account_id" may be replaced with an actual value of account_id, for example, "12345" during hydration. The template hydration process may access a data source for example, a configuration file or a database to identify actual values of parameters used in templating expressions. For example, a templating expression may represent a set of computing systems of a cluster. A database may be used to store the set of computing systems for each target. The system accesses the database to determine the value of the templating expression.

According to an embodiment, at least some of the templating expressions of the pipeline template represent attributes of datacenter entities. Accordingly, the pipeline compiler obtains the actual values for the template variables from attributes describing datacenter entities stored in the datacenter metadata store 1120. The attributes describing datacenter entities stored in the datacenter metadata store 1120 are obtained from a declarative specification of the datacenter. A templating expression value may be provided by a user, for example, via configuration parameters.

Some of the templating expressions or template variables represent references to other pipelines. Use of references to other pipelines allows the pipelines to be split into smaller pipelines that are easier to manage compared to large monolithic pipelines. Embodiments of the system perform partial hydration of pipeline templates. A partially hydrated template may also be referred to as a precompiled template. The system stores the partially hydrated templates. A partially hydrated template may be reused for generating multiple pipelines, for example, pipelines for different cloud platforms, pipelines for different instances of a service type, and so on. Furthermore, partially hydrated templates can be reused if changes caused by a change in datacenter metadata affect other pipeline templates. As an example, consider a pipeline template t1 that includes a templating expression representing a reference to a pipeline template t2. A change in a datacenter configuration may require rehydration of pipeline template t2 since the values of one or more template variables have changed. However, the partially hydrated template t1 can be reused when generating the final pipelines for execution based on t1 and t2. Since changes in datacenter configuration may affect only a subset of templates, the ability to generate partially hydrated templates improves performance by not requiring hydration of all pipeline templates. This provides an optimized compilation of pipelines from master pipelines.

In an embodiment, the pipeline generator module 320 generates a dependency graph of pipeline templates. The dependency graph includes an edge from a source pipeline template to a target pipeline template if the source pipeline template includes a reference to the target pipeline template indicating that the source pipeline depends on the target pipeline. The pipeline generator module 320 generates pipelines from the pipeline templates in the reverse order of dependencies, such that if a source pipeline depends on the target pipeline, the target pipeline is generated before the source pipeline template. Generating the pipelines in the reverse order of dependencies ensures that a pipeline identifier of the target pipeline generated from the target pipeline template is available when the source pipeline is generated from the source pipeline template.

The pipeline store 1140 stores the pipelines generated by the pipeline compiler 1140. The pipelines stored in pipeline store 1140 are transmitted to a pipeline execution engine 360 for execution. The execution of the pipeline causes execution of a set of actions associated with configuration of a service running in a datacenter configured on a cloud platform. The set of actions may cause changes to configurations of services running on datacenter entities, for example, upgrades to software artifacts, changes to configurations of resources used by the system (for example, infrastructure resource such as load balancers, databases, servers, firewalls, network resources, and so on), data center configuration changes, modifications to libraries and other system artifacts used by the system, modifications to applications, and so on.

The version control module 340 manages versions of software releases including metadata describing datacenters, software artifacts, configurations of resources, as well as pipelines and pipeline templates generated for managing software releases on datacenters configured on cloud platforms. Details of the version control module 340 are described in further details, for example, in connection with FIG. 15.

Figure 12:
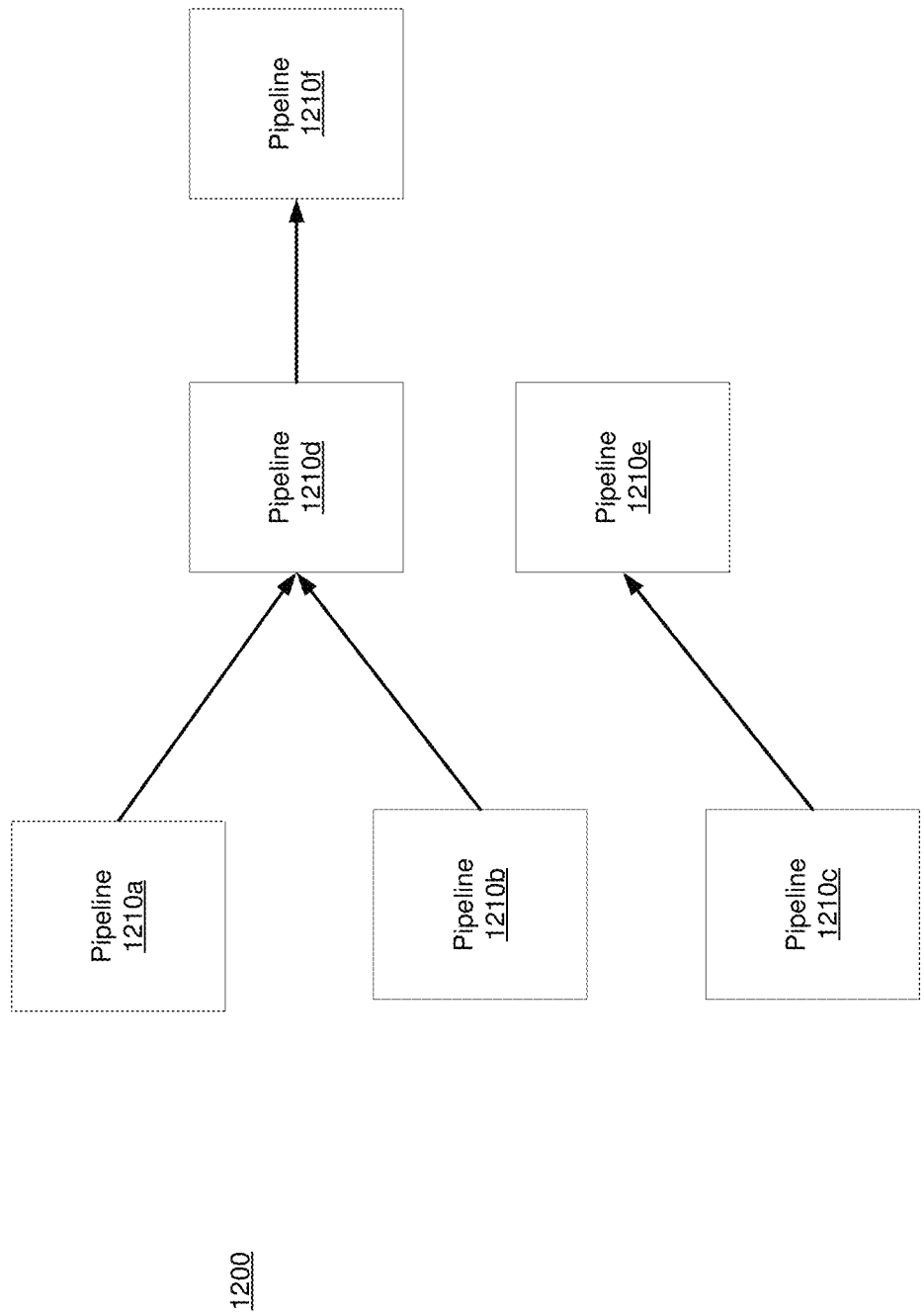
FIG. 12 shows an example configuration of pipeline templates according to an embodiment.

FIG. 12 shows an example configuration of pipelines according to an embodiment. As shown in FIG. 12, a pipeline may include a reference (also referred to as a link) to another pipeline. For example, pipeline 1210a includes a reference to pipeline 1210d, pipeline 1210b includes a reference to pipeline 1210d, pipeline 1210c includes a reference to pipeline 1210e, pipeline 1210d includes a reference to pipeline 1210f, and so on. If a source pipeline p1 includes a reference to a target pipeline p2, the corresponding pipeline template t1 used to generate the pipeline p1 may include a templating expression or template variable that represents a reference to the target pipeline p2. A partially hydrated template is obtained by substituting the values of various template variables but not substituting the values of pipeline references. Accordingly, the partially hydrated template may include one or more templating expressions that represent pipeline references. This allows the pipeline template to be reused for generating multiple pipelines since each generated pipeline may include a different value of the pipeline reference. A pipeline reference may be represented using an identifier that uniquely identifies the pipeline. A templating expression that resolves into a pipeline may include function calls that generate the pipeline identifier.

Overall Process

Figure 13:
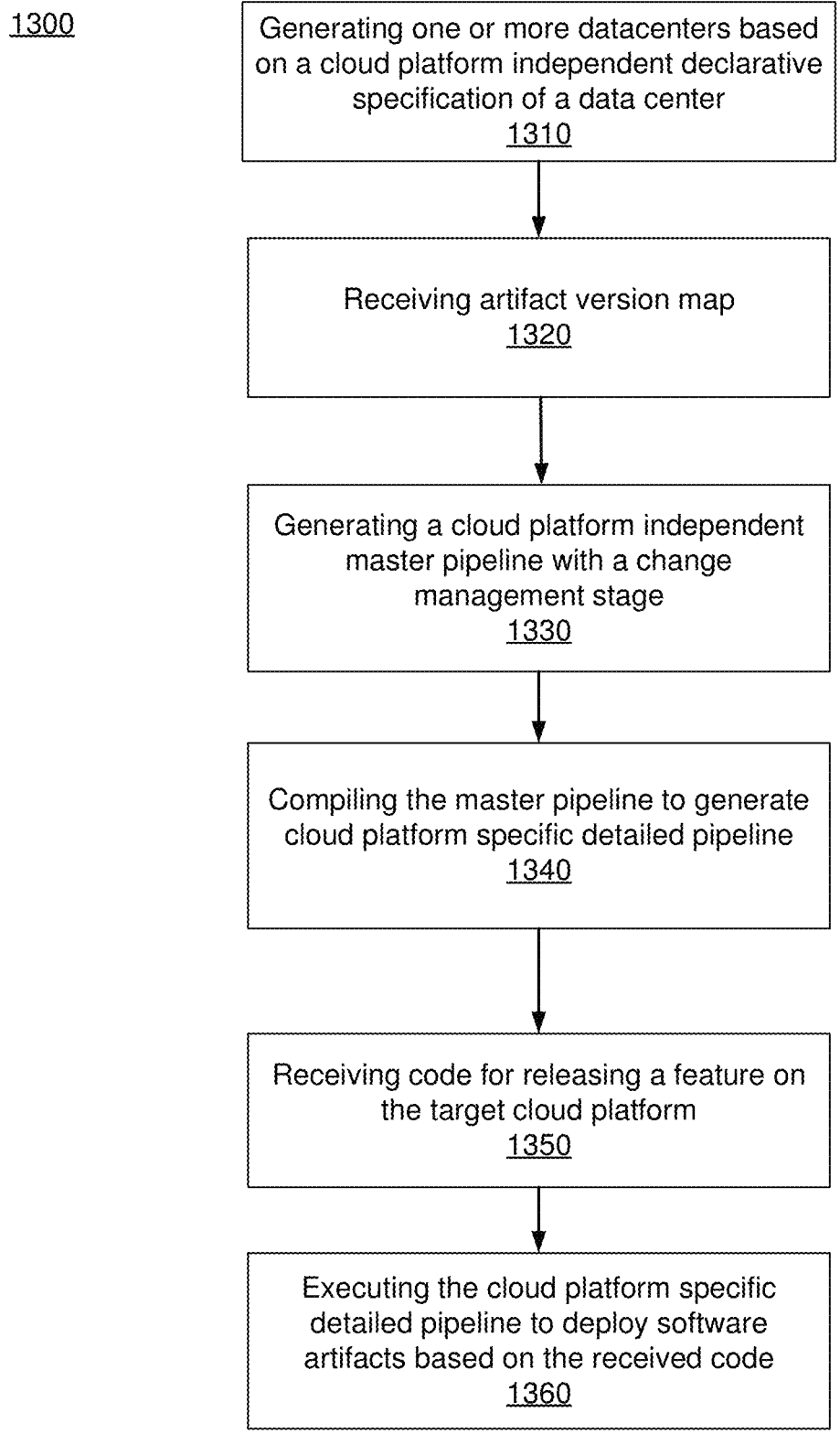
FIG. 13 shows the overall process for deployment of software artifacts on datacenters configured on a cloud platform according to an embodiment.

FIG. 13 shows the overall process for deployment of software artifacts on datacenters configured on a cloud platform according to an embodiment. The datacenter generation module generates 1310 one or more datacenters on a target cloud platform. Each datacenter is generated from a cloud platform independent declarative specification and has a hierarchy of datacenter entities.

The software release management module 230 receives as input, an artifact version map that maps datacenter entities to versions of software artifacts. The software release management module 230 also receives 1330 as input, a cloud platform independent master pipeline.

The software release management module 230 compiles 1340 the cloud platform independent master pipeline in conjunction with the artifact version map to generate a cloud platform specific detailed pipeline. In an embodiment, the generated cloud platform specific detailed pipeline includes artifact version map filters before certain stages to determine whether certain stages should be enabled or disabled according to the artifact version map.

The software release management module 230 further receives 1350 code for releasing one or more features of services deployed on the datacenter. For example, the code may represent source code obtained from a version control management system storing source code repositories to which changes are submitted by developers. The software release management module 230 executes 1360 the cloud platform specific deployment pipeline to deploy software artifacts based on the received code.

The artifact version map and master pipelines can be used to orchestrate various types of operations related to continuous delivery of software artifacts in a cloud-based datacenter. The artifact version map and the master pipelines can be configured to perform aggregate retry operations for a service or a service group or any datacenter entity. The artifact version map includes configurations of retry operations for a datacenter entity, including the retry strategy, a threshold number of retries to perform in case of failure to execute a stage of a pipeline, whether confirmation from a user is required before retrying or retry is performed automatically, and so on.

Process of Pipeline Generation

Figure 14:
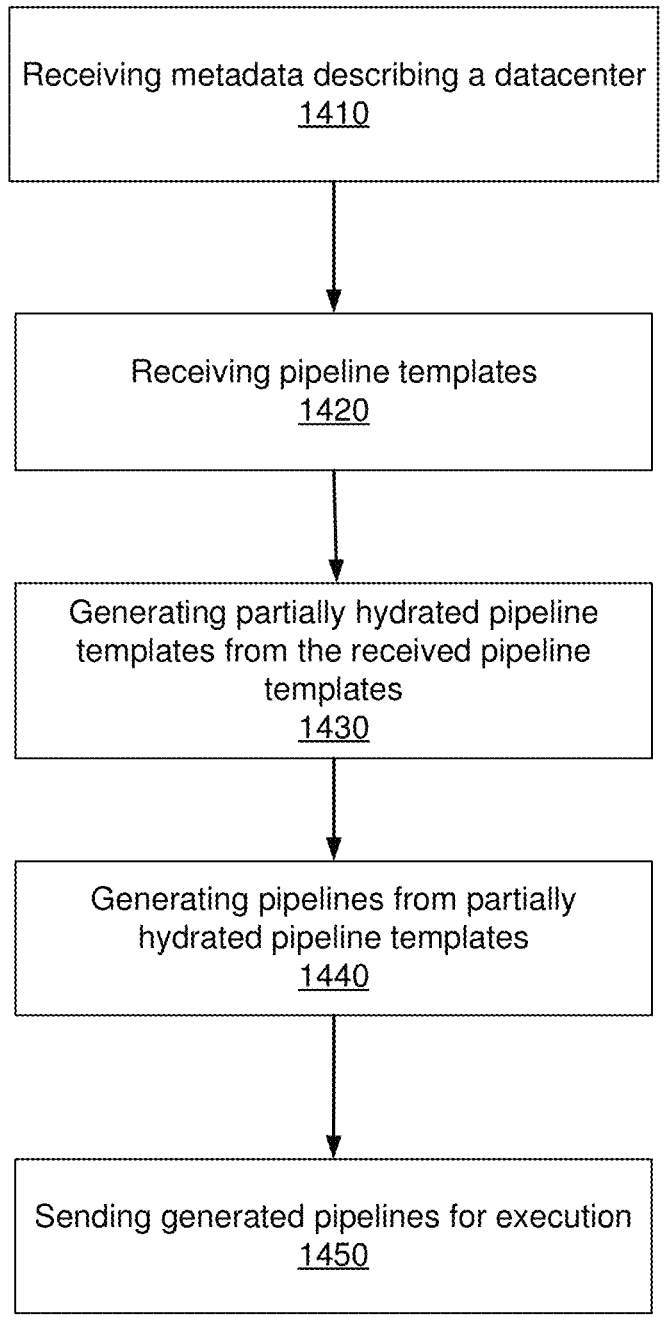
FIG. 14 shows the overall process for compilation of pipelines according to an embodiment.

FIG. 14 shows the overall process for compilation of pipelines according to an embodiment. The steps shown in any process disclosed herein may be performed by modules other than those indicated herein. Furthermore, the steps may be performed in an order different from that described herein.

The pipeline generator module 320 receives 1410 metadata describing a datacenter configured on a cloud platform. The metadata includes attributes describing various datacenter entities.

The pipeline generator module 320 receives 1420 a plurality of pipeline templates. A pipeline template comprises (1) instructions to perform a set of actions associated with releasing a software artifact on the cloud platform, (2) one or more templating expressions representing placeholders for values, and (3) one or more templating expressions representing links to other pipelines.

The pipeline generator module 320 generates 1430 a plurality of partially hydrated pipeline templates from the plurality of pipeline templates, wherein a partially hydrated pipeline template is generated from a pipeline template by substituting templating expressions representing placeholders for values with actual values, wherein at least some of the actual values are obtained from metadata describing datacenter entities of a datacenter. Examples of attributes describing datacenter entities include datacenter instance name, service group name, service instance name, user accounts associated with a software artifact or with a service, a communication channel associated with a service. For example, if there are multiple environments created in a datacenter, for example, development, testing, canary, and production environments, the pipeline template may be partially hydrated for each environment based on variable values for that specific environment.

Following is an example snippet of a pipeline template that uses templating expressions.

```
...
pipeline: {{ get_pipeline_id(parameter1, parameter2) }}
pipelineParameters:
    SERVICE_GROUP_NAME: {{ vars.std.pipeline.service_group }}
    SERVICE_INSTANCE_ID: {{ vars.std.pipeline.service_id }}
    SERVICE_TEAM: {{ vars.std.pipeline.team }}
    DATACENTER_INSTANCE: {{
    vars.std.pipeline.datacenter_instance }}
...
```

The value of the pipeline variable is determined using a function or macro get_pipeline_id that receives two parameters parameter1, parameter2 and determines the pipeline identifier. In an embodiment, the function to get the pipeline identifier accesses a pipeline execution engine 360 (e.g., a spinnaker instance) to obtain the pipeline identifier.

Various pipeline parameters including SERVICE_GROUP_NAME, SERVICE_INSTANCE_ID, SERVICE_TEAM, DATACENTER_INSTANCE are determined using templating expressions that may be template variables such as vars.std.pipeline.service_group, vars.std.pipeline.service_id, vars.std.pipeline.team, and vars.std.pipeline.datacenter_instance respectively. These template variables may be defined using datacenter metadata that is specified using the declarative specification. A variable value may also be determined using configuration parameters set by users. Following is a partially hydrated pipeline template based on the above pipeline template.

```
...
pipeline: {{ get_pipeline_id(parameter1, parameter2) }}
pipelineParameters:
    SERVICE_GROUP_NAME: "service_group1"
    SERVICE_INSTANCE_ID: "service_instance1"
    SERVICE_TEAM: "service_team1"
```

```
DATACENTER_INSTANCE: "datacenter1"
...
```

In the partially hydrated pipeline template the templating expressions representing variables are replaced with values but the pipeline reference is not evaluated. Accordingly, the values of pipeline parameters including SERVICE_GROUP_NAME, SERVICE_INSTANCE_ID, SERVICE_TEAM, DATACENTER_INSTANCE are evaluated to be "service_group1", "service_instance1", "service_team1", and "datacenter1" respectively.

Some template variables may be substituted with values obtained from users, for example, configuration parameters that depend on specific policies to follow in various situations such as actions to take if a specific type of failure is encountered, values of specific thresholds, e.g., memory usage limit, CPU usage limit, and so on. The partially hydrated pipeline templates include templating expressions that represent pipeline links to other pipelines since these are not yet hydrated.

The pipeline generator module 320 generates 1440 a plurality of pipelines from a partially hydrated pipeline template, wherein a pipeline is generated from the partially hydrated pipeline template by substituting one or more templating expressions representing links with corresponding pipeline identifiers. For example, a pipeline based on the partially hydrated pipeline template example shown above is as follows in which the value of the pipeline reference is evaluated to the value "pipeline1".

```
...
pipeline: "pipeline1"
pipelineParameters:
    SERVICE_GROUP_NAME: "service_group1"
    SERVICE_INSTANCE_ID: "service_instance1"
    SERVICE_TEAM: "service_team1"
    DATACENTER_INSTANCE: "datacenter1"
...
```

The same partially hydrated pipeline template may be used to generate different pipelines such that the reference is evaluated to a different pipeline. For example, for a different environment, the partially hydrated pipeline template may be evaluated to the following pipeline in which the pipeline reference evaluated to the value "pipeline2".

```
...
pipeline: "pipeline2"
pipelineParameters:
    SERVICE_GROUP_NAME: "service_group1"
    SERVICE_INSTANCE_ID: "service_instance1"
    SERVICE_TEAM: "service_team1"
    DATACENTER_INSTANCE: "datacenter1"
...
```

The pipeline generator module 320 sends 1450 one or more generated pipelines for execution, wherein the execution of a pipeline causes the set of actions associated with continuous delivery of the software release on the cloud platform.

The plurality of pipeline templates can be used to generate sets of pipelines for multiple cloud platforms. For example, the plurality of pipeline templates can be used for generating a first set of pipelines that are deployed on a first cloud platform such as AWS. The plurality of pipeline templates can be used for generating a second set of pipelines that are deployed on a second cloud platform such as GCP. The partially hydrated pipeline templates generated for the two different cloud platforms may be different since the templating expressions may evaluate to different values for different cloud platforms.

In some embodiments, the pipeline generator module 320 saves each plurality of partially hydrated pipeline templates that is generated in associated with a point in time. For example, the plurality of partially hydrated pipeline templates may be associated with a time stamp. Each plurality of partially hydrated pipeline templates may be associated with a version identifier. For example, one or more partially hydrated pipeline templates may be regenerated responsive to a specific set of changes to the datacenter representation. The set of changes to the datacenter representation may be associated with a version identifier. The plurality of partially hydrated pipeline templates generated as a result of the change may be associated with the version identifier. Each plurality of partially hydrated pipeline templates may include one or more newly generated partially hydrated pipeline templates and at least some partially hydrated pipeline templates that were generated previously. Accordingly, only a subset of partially hydrated pipeline templates may change between one version and the next version of the plurality of partially hydrated pipeline templates.

In an embodiment, the deployment module 210 receives a request to roll back the configuration of a datacenter entity or a service to a previous version. The deployment module 210 accesses the plurality of partially hydrated pipeline templates corresponding to the previous version specified in the rollback request. The pipeline generator module 320 generates a set of pipelines based on the plurality of partially hydrated pipeline templates and deploys the generated set of pipelines, thereby rolling back the version of the configuration of the datacenter entity or service to the previous version.

The ability to include a pipeline reference in a pipeline allows a pipeline to be split into smaller pipelines that can refer to other pipelines and also be able to reuse a pipeline, for example, by including references to the pipeline in multiple other pipelines. This allows reusability of code and instructions included in the pipelines. Furthermore, the effect of changes to configuration parameters, for example, metadata describing the datacenter entities can be localized to smaller pipeline templates instead of a large pipeline template. For example, if a large pipeline template is split into multiple smaller pipelines, a change in configuration parameters may affect only a subset of the pipeline templates. Accordingly, the subset of pipeline templates is rehydrated and the remaining partially hydrated pipeline templates can be reused.

The partially hydrated pipeline templates can be reused for generating pipelines in multiple environments, thereby providing significant improvement in performance compared to a system that generates the pipelines directly from the input pipeline templates. A new set of pipelines may be generated from partially hydrated pipeline templates if a new service instance is added. Accordingly, the partially hydrated pipeline templates may be reused for multiple service instances. The performance improvement may be two orders of magnitude if a large number of pipelines are being generated. A system may have several thousand pipeline templates that result in generation of several hundred thousand pipelines since pipelines may be generated for several target environments and service instances. Furthermore, the system may store up to five versions of each set of pipeline template to allow rollback and roll forward across the versions.

Versioning of Service Deployments

In an embodiment, the system creates versions of sets of partially hydrated pipeline templates. The versions of the sets of partially hydrated pipeline templates are stored independent of the datacenter metadata. If a change to a datacenter metadata is received, a specific version of the partially hydrated pipeline templates can be selected and used with the revised datacenter metadata. Different versions of partially hydrated pipeline templates may be stored for different environments, for example, one version of partially hydrated pipeline templates for development environment and another version for production environment. In an embodiment, the system stores a version store storing metadata describing various versions.

Furthermore, the saved partially hydrated pipeline templates are associated with versions, thereby providing a library of different versions of partially hydrated pipeline templates. A version may be generated if there is a change in a pipeline template or if there is a change in datacenter metadata or both. Changes to a datacenter metadata may occur because the datacenter is modified to accommodate changes in system resources, system usage, and so on. A user can specify a specific version of the set of partially hydrated pipeline templates and generate pipelines for that specific version. This allows rollback to older versions of pipeline templates or roll forward to newer versions of pipeline templates. Any version can be selected and efficiently deployed since the partially hydrated pipeline templates can be efficiently converted to pipelines.

A deployment package may be identified using a checksum that represents the state of the pipeline template, libraries, and macros at the time of the version that was created and stored in the deployment package. In an embodiment, the system stores checksums in pipeline templates and partially hydrated pipeline templates. If a partially hydrated pipeline template with matching checksum is available for a pipeline template, the partially hydrated pipeline template can be used. If a partially hydrated pipeline template with matching checksum is available for a pipeline template, the partially hydrated pipeline template is generated and stored for future use. The reuse of a previously stored partially hydrated pipeline template that has matching checksum with a pipeline template is significantly more efficient process since all templating expressions have been previously evaluated and substituted with values.

Storing different versions of partially hydrated pipeline templates allows the system to rollback to a previous version or roll forward to a newer version efficiently, without having to spend processing time in recompiling the pipeline templates. Furthermore, the system stores the sets of partially hydrated pipeline templates for various versions since it may be difficult to regenerate the set of partially hydrated pipeline templates if the user wanted to roll back to a previous version. This is so because a deployment of a software artifact is affected by various parts of the system including source code of software artifacts, system configurations, datacenter metadata, and so on. Changes may occur in various parts of the system making it difficult to recreate the system configuration at that specific point in time. Storing a version of a set of partially hydrated pipeline templates acts as a snapshot of the system configuration at specific points in time that can be used to recreate the system configuration at that point in time efficiently and easily.

The versioning of pipeline templates allows the service owners and developers to ensure that a stable version of software is being used in production environments or any other environment although other versions are being developed and are in various stages of development and testing. The system is able to identify a stable snapshot of code for use in a given environment. Accordingly, the system support pipeline versioning to ensure service owners can rollout pipeline customizations in a staggered way, promote stable versions of services, and rollback if a failure is encountered for a software release deployed for a service.

The deployment module 210 supports versioning of pipeline templates so that service owners can make changes to pipelines for customizing them and promote stable changes. The versioning of pipeline templates also allows roll back of pipelines to an earlier version of a currently deployed version of pipelines has issues. When users submit changes, for example, changes to a pipeline template associated with a datacenter entity or a service, the system identifies a set of pipeline templates associated with the datacenter entity or the service and generates a deployment package comprising the set of pipeline templates and any metadata necessary for converting the pipeline templates to pipelines. The system stores a plurality of deployment packages, each deployment package representing a version of pipeline templates representing a system configuration change. A set of version pointers are used to label specific deployment packages. For example, a particular deployment package may be identified as a stable version using a stable version pointer. When a request to deploy a software artifact is received for a datacenter entity, a version pointer is identified for the datacenter entity and the corresponding deployment package retrieved. The pipeline templates of the deployment package are compiled into pipelines that are sent for execution.

Furthermore, since the system supports versioning of pipeline templates, a deployment package can be used across different environments, across different substrates, as well as across multiple service instances. This is more flexibility and reusability compared to a system that supports versioning of pipelines configured for a specific substrate and a specific environment as well as a specific service instance.

System Architecture for Versioning

Figure 15:
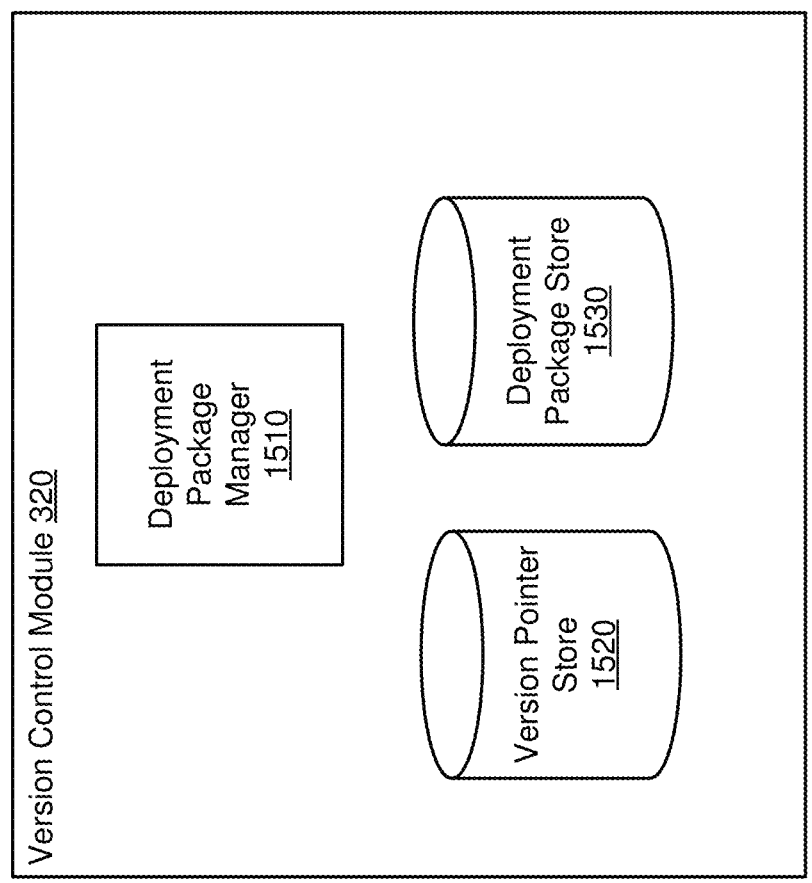
FIG. 15 shows the system architecture of a version control module according to an embodiment.

FIG. 15 shows the system architecture of a version control module according to an embodiment. The version control module comprises a deployment package manager 1510, a version pointer store 1520, and a deployment package store 1530. Other embodiments may include more or fewer modules than those indicated herein.

The deployment package manager 1510 manages deployment packages. Accordingly, the deployment package manager 1510 generates deployment packages when system configuration changes are received from users. A pipeline template may be an aggregate pipeline template that represents a group of pipeline templates associated with a datacenter entity, for example, pipeline templates for the datacenter pipeline 1010 or cell pipeline 1020, 1025 illustrated in FIG. 10. A pipeline template may be used to generate a service pipeline 1030 also referred to as a deployment pipeline or a unit pipeline. A pipeline template may be used to generate a shared pipeline, for example, pipeline 1210d shown in FIG. 12. A shared pipeline implements some general-purpose task that can be invoked by multiple other pipelines. A master pipeline or an aggregate pipeline may invoke one or more service pipelines which in turn may invoke one or more shared pipelines. A deployment package stores a set of related pipeline templates that have the same version including the pipeline template version, template library version, macros version, values of pipeline arguments, shared pipeline version, and also aggregate pipeline version. A macro includes instructions for automatically generating at least a portion of a pipeline. The entire set of related data is stored as a deployment package and associated with a version identifier, for example, a checksum that uniquely identifies the deployment package.

The deployment package store 1530 stores multiple deployment packages. The deployment package store 1530 associates a version identifier, e.g., a checksum with each deployment package. The checksum may be based on various attributes of the pipeline templates and other data included in the deployment package, for example, the length of the pipeline, the names of stages of the pipelines, or a string representation of the pipeline. The version identifier can be used to identify the deployment package, for example, using a version pointer. The system can roll back a service instance to a specific version using the deployment package for that version. The deployment package stores all pipeline templates as well as other information (e.g., macros, libraries, arguments, and so on) needed for generating the pipelines from the pipeline templates. A pipeline may be generated from multiple smaller pipeline templates. The version of all pipeline templates used for generating a pipeline at a particular point in time are stored in a deployment package. The pipeline generator module 320 generates a pipeline from the pipeline templates and supporting information of the deployment package for that version and executes it using a pipeline execution engine 360. The version identifier of the deployment package may be included in the pipeline to be able to correlate the pipeline with the correct deployment package. The same version of pipeline may be executed on multiple instances of the pipeline execution engine 360, each running on a different processor as well as for multiple service instances on each pipeline execution engine 360. The generation of pipelines using the pipeline templates of a deployment package comprises determining pipeline identifiers for different pipelines and replacing any pipeline references in the pipeline template with the pipeline identifiers. The deployment package may be stored as a set of files, for example, partially hydrated pipeline templates (i.e., precompiled pipeline templates) within a directory of a file system. The directory may have a name that is uniquely associate with a version, for example, the directory may be a named as the version identifier. The deployment package may store additional files that store state information that describes information such as (1) a version of the metadata describing a datacenter, for example, a version of a declarative specification used to configure the datacenter and (2) code changes or code commits that were checked in for modifying a templates that resulted in creation of a new version. Although the state information is not needed to convert a partially hydrated pipeline template to pipelines, the state information may be used for generate the pipelines from pipeline templates (that have not yet been partially hydrated) if needed. There may be hundreds of thousand of deployment packages saved in a large online system such as a multi-tenant system. In an embodiment, a new version is created whenever there is a set of changes made to the pipeline templates or changes made to metadata used for generating pipelines, for example, metadata describing a datacenter that may affect a pipeline creation.

In an embodiment, the system performs a dependency analysis to determine whether a change that is made to the files can affect a pipeline. If the change can modify a pipeline, a deployment package is created for that version. If the change does not affect a pipeline, the deployment package is not created for that pipeline. Accordingly, whenever a user such as a service owner modifies a pipeline template, the system performs a dependency analysis to identify the pipelines that are impacted by the change and generates a version and corresponding deployment package based on the change. For example, is a shared pipeline template is modified, several pipelines (for different services) may be impacted by the change. The pipeline store stores the various deployment packages as well as metadata describing the deployment packages and information describing what changes resulted in creation of the version.

Some of the versions created are identified using version pointers, for example, a stable version, and a latest version. The version pointer store 1520 stores a set of version pointers. A version pointer may also be referred to as a version label. In an embodiment, the version pointer store 1520 is a file, for example, a YAML file. In an embodiment, the system stores at least three version pointers, a stable version pointer, a latest version pointer, and a last known good version pointer. A last known good version pointer may be different from a stable pointer when there are several recent versions since a stable version was created and a service owner identifies one of the recent versions that is relatively stable as the last known good version pointer. At some point the last known good pointer may become a stable pointer. Each version pointer identifies a version and the corresponding deployment package having the identified version. Version pointers may be defined for a service or for an application. In an embodiment, the version pointer store 1520 stores a prefix of a checksum representing the version, so long as the prefix includes enough character or bytes to be able to uniquely identify the version. The latest version pointer always refers to the state of the template, variables, macros, libraries and datacenter metadata at the time that the pipeline generator executes.

In an embodiment, the version store associates a version pointer with a scope specified using the datacenter metadata. Accordingly, the version of the deployment package corresponding to the version pointer is applicable to all datacenter entities specified by the scope. For example, the version pointer may be associated with a datacenter, a service group, a service instance, or a combination of these. In an embodiment, the scope of a version pointer is a pipeline execution engine 360 such that all pipelines executed in the pipeline execution engine 360 correspond to the version specified by the version pointer.

Following is an example of data stored in a version pointer store 1520.

```
version_pointers:
  examples:
    stable:
    - target_label: a942
        datacenter_instances:
        - testm1
        service_groups:
        - foundation
        service_instances:
        - radius0001
        pipeline_execution_engine_instances:
        - PRODUCTION
    last_known_good:
    - target_label: stable
    stable:
    - target_label: latest
    custom_version_pointer:
```

```
- target_label: ffe0
- downstream_label: stable
```

In the above example, the version pointer store defines version pointers stable, last_known_good, stable, and custom_version_pointer. A service may also be referred to as an application. Each version pointer defines the value of the version as the target_label attribute. The stable version pointer specified scope of the version pointer using attributes datacenter instances, service groups, service instances and pipeline execution engine instances. The value of each attribute can be a regular expression, for example, datacenter instances value can be a regular expression that evaluates to multiple datacenter instances. In an embodiment, the system maintains a directory hierarchy, for example, team/application/pipeline directory. A team can have multiple applications and each application can have multiple pipeline directories. The corresponding data is stored in the appropriate directory of the deployment package. Accordingly, the target label a942 is used as the version pointer for the specified datacenter entities and specified pipeline execution engine instance. The target label a942 maybe a shortened from the real version checksum that may be much longer, for example, a942291be1bba073. The latest version pointer represents the current configuration files and code for pipeline templates. Accordingly, if the version pointer points at latest version, the pipeline generator collects the latest files in the system and uses them to generate pipelines. In an embodiment, a pipeline directory of a deployment package corresponds to an entry representing a pipeline of a service identified in the datacenter metadata or the datacenter declarative specification. Each pipeline performs a specific task for the service, for example, deploying, provisioning, patching, utility, and so on.

In an embodiment, the system provides a user interface or an application programming interface to allow users such as service owners or developers to browse all available versions. The user interface or an application programming interface provides details of each version for example, the code changes that resulted in creation of the version so that users can determine whether they want to use that specific version.

Figure 16:
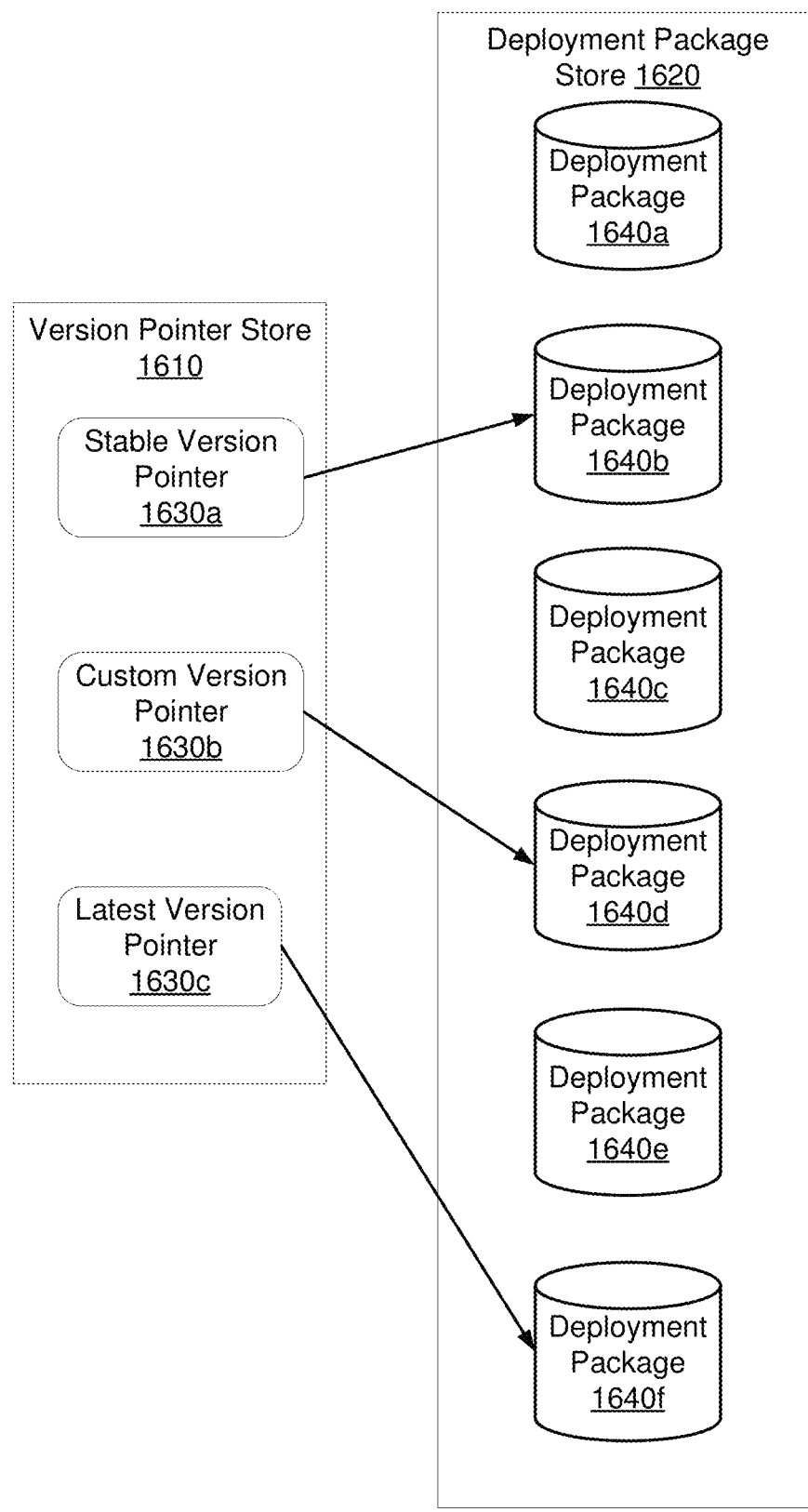
FIG. 16 shows illustrates management of version pointers, according to an embodiment.

FIG. 16 shows illustrates management of version pointers, according to an embodiment. The version pointer store 1610 may store one or more version pointers. For example, the version pointer store 1610 illustrated in FIG. 16 includes a stable version pointer 1630a, a custom version pointer 1630b, and a latest version pointer 1630c. Other embodiments may include more or fewer version pointers. Each version pointer may be modified to point at any deployment package in the deployment package store 1620. For example, the deployment package store 1620 shown in FIG. 16 includes several deployment packages 1640a, 1640b, 1640c, 1640d, 1640e, and 1640f. The stable version pointer 1630a points at deployment package 1640b, the custom version pointer 1630b points at deployment package 1640d, and the last version pointer 1630a points at deployment package 1640f.

Process for Managing Versions

Figure 17:
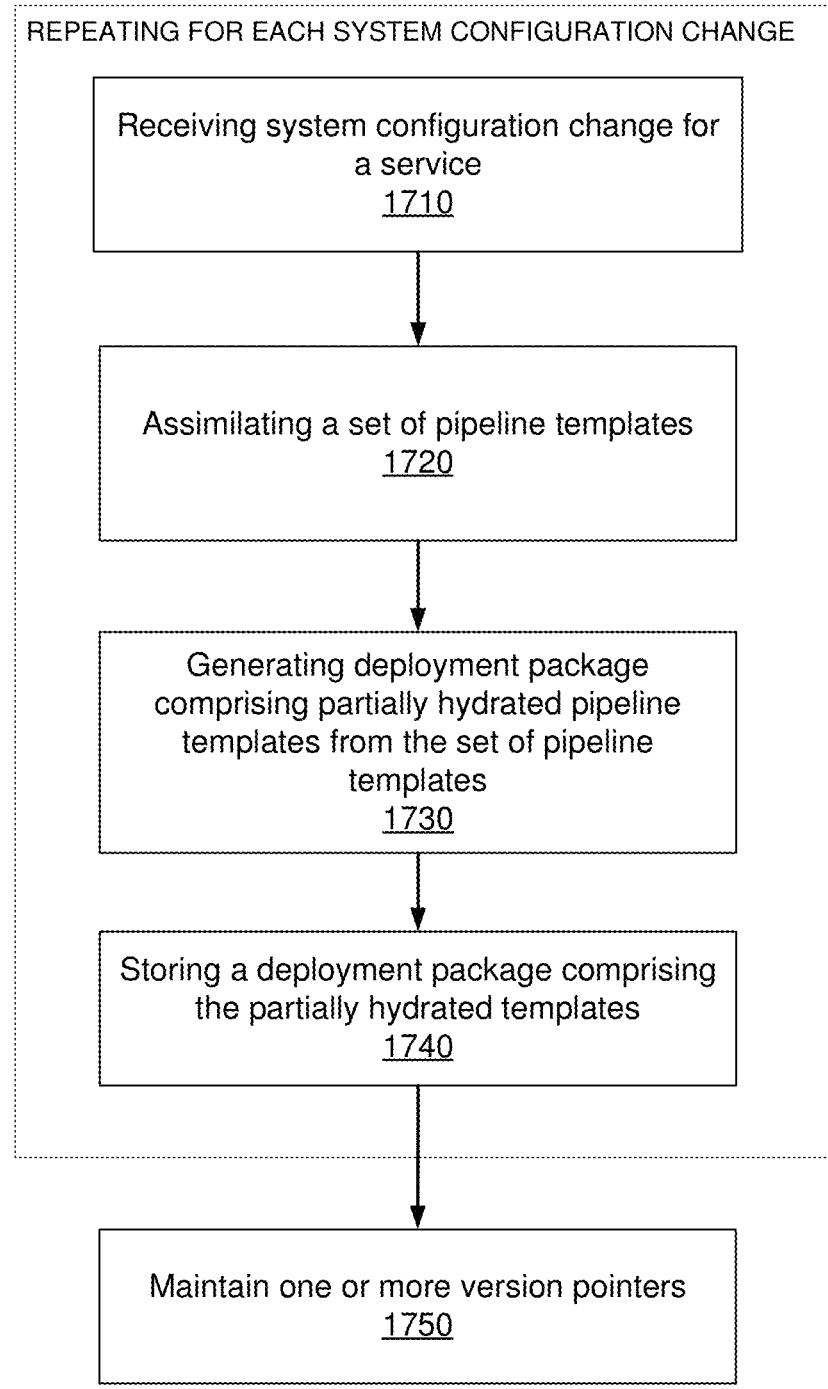
FIG. 17 shows the process of managing versions of service deployments, according to an embodiment.

FIG. 17 shows the process of managing versions of service deployments, according to an embodiment. The steps shown in the flowcharts may be executed in an order different from that indicated in the flowchart.

The version control module 320 receives metadata describing a datacenter configured on a cloud platform. The datacenter is configured to execute a set of services on the cloud platform. The metadata describes a hierarchy of datacenter entities of the datacenter. The version control module 320 generates a plurality of deployment packages. The deployment package may be for an application or for a set of services. Each deployment package represents a version of pipeline templates. Each deployment package is generated using following steps.

The version control module 320 receives 1710 a request for a system configuration change associated with the service. The system configuration changes may represent a change to a pipeline template, a change to configuration of system resource of a datacenter entity, change to a software artifact associated with a service, and so on.

The version control module 320 assimilates 1720 a set of pipeline templates associated with an application or for a set of services for storing as a deployment package. The version control module 320 generates 1730 a deployment package based on a plurality of pipeline templates associated with the system configuration change. The deployment package may comprise a set of pipeline templates or a set of partially hydrated pipeline templates along with state used for hydrating pipeline templates. The version control module 320 stores 1740 the deployment package, for example, in a database or a file system.

The version control module 320 maintains 1750 one or more version pointers. A version pointer represents a selected deployment package from the plurality of deployment packages. The system may receive an update to a version pointer and deploys a pipeline based on the deployment package corresponding to the updated version pointer.

Figure 18:
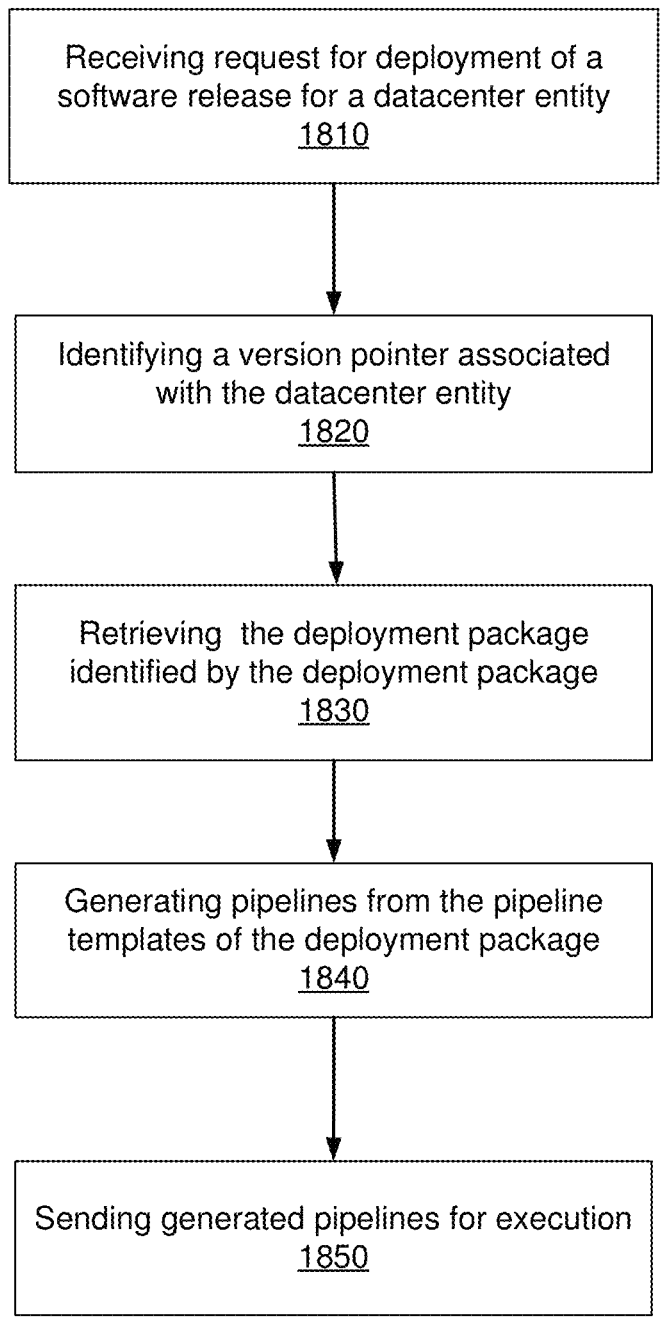
FIG. 18 shows the process of deploying a particular version of a software release, according to an embodiment.

FIG. 18 shows the process of deploying a particular version of a software release, according to an embodiment.

The version control module 320 receives 1810 a request for deploying a software release associated with the datacenter entity. The version control module 320 identifies 1820 a version pointer associated with the datacenter entity.

The version control module 320 retrieves 1830 the deployment package pointed at by the version pointer. The version control module 320 generates 1840 a set of pipelines based on the deployment package. For example, if the deployment package stores a set of partially hydrated pipeline templates, the set of pipelines are generated by substituting any templating expressions with values or pipeline identifiers.

The version control module 320 sends 1850 the generated set of pipelines for execution on the datacenter configured on the cloud platform. The execution of each pipeline causes a set of actions associated with continuous delivery of a service or a set of services for a datacenter entity configured on the cloud platform.

Embodiments allow users to select specific versions of pipeline templates and use them for specific services, applications, or datacenter entities. The developers or service owners can continue to make further changes to the system configuration files or pipeline templates. However, the system continues to use a pipeline template corresponding to the version specified by a version pointer, for example, the stable version pointer. The service owners may change the version pointer for specific environments, for example, to test the latest version in a development environment while the stable version continues to be deployed in the production environment.

At some point in time, the users can update the version pointer of the production environment. For example, the system receives an update to the stable version pointer where it is modified to point at a more recent version. The system generates the pipelines using the updated version and deploys them to the datacenter entities identified in the version pointer store. If an issue is identified in the updated version, the user may modify the version pointer to point at an earlier version in the version store. The system receives the change to the version pointer and rolls back the pipelines to the previous version. Accordingly, the system generates pipelines using the previous version and deploys them using the pipeline execution engine.

Computer Architecture

Figure 19:
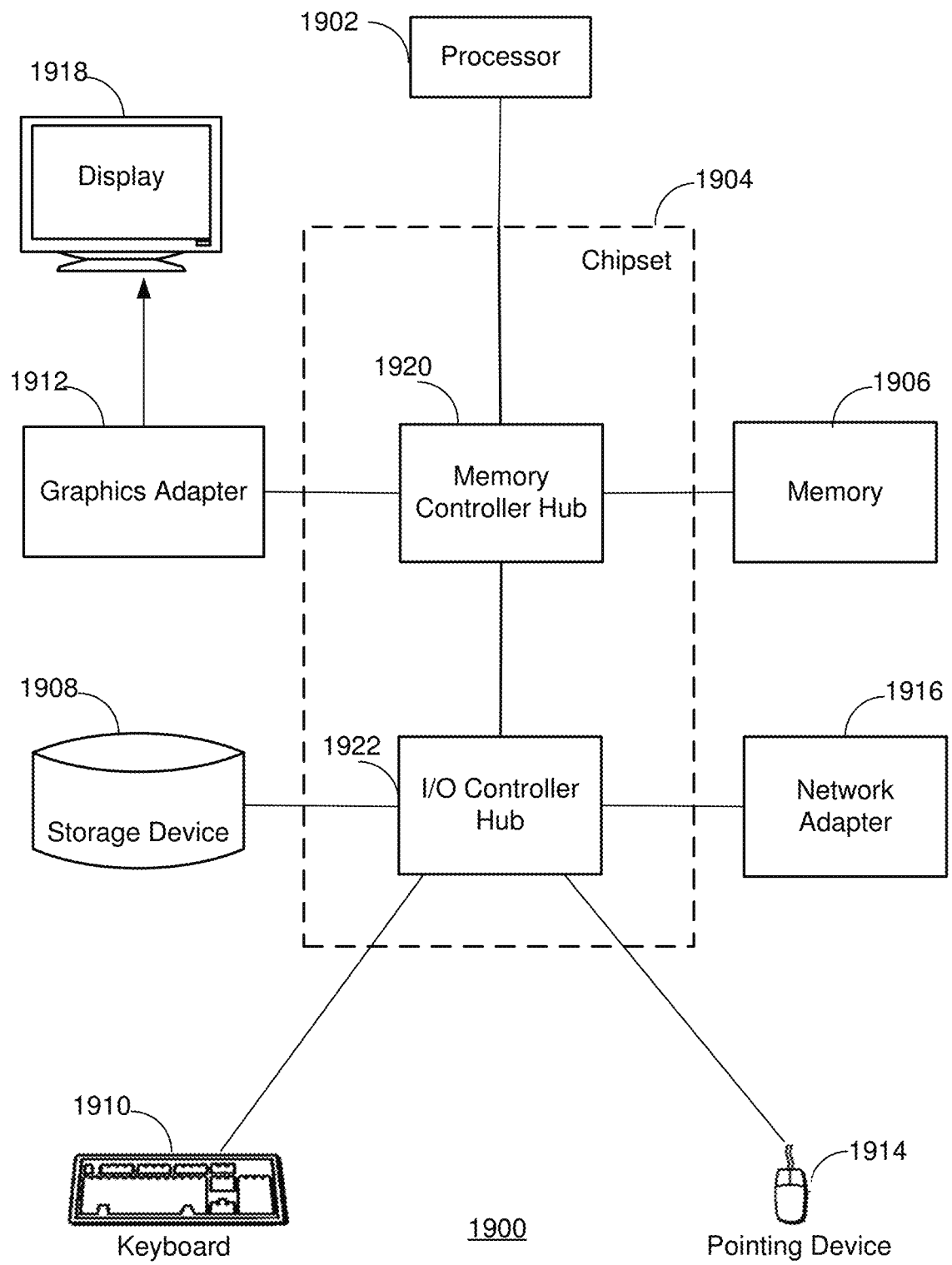
FIG. 19 is a block diagram illustrating a functional view of a typical computer system for use in the environment of FIG. 1 according to one embodiment.

FIG. 19 is a high-level block diagram illustrating a functional view of a typical computer system for use as one of the entities illustrated in the environment 100 of FIG. 1 according to an embodiment. Illustrated are at least one processor 1902 coupled to a chipset 1904. Also coupled to the chipset 1904 are a memory 1906, a storage device 1908, a keyboard 1910, a graphics adapter 1912, a pointing device 1914, and a network adapter 1916. A display 1918 is coupled to the graphics adapter 1912. In one embodiment, the functionality of the chipset 1904 is provided by a memory controller hub 1920 and an I/O controller hub 1922. In another embodiment, the memory 1906 is coupled directly to the processor 1902 instead of the chipset 1904.

The storage device 1908 is a non-transitory computer-readable storage medium, such as a hard drive, compact disk read-only memory (CD-ROM), DVD, or a solid-state memory device. The memory 1906 holds instructions and data used by the processor 1902. The pointing device 1914 may be a mouse, track ball, or other type of pointing device, and is used in combination with the keyboard 1910 to input data into the computer system 200. The graphics adapter 1912 displays images and other information on the display 1918. The network adapter 1916 couples the computer system 1900 to a network.

As is known in the art, a computer 1900 can have different and/or other components than those shown in FIG. 19. In addition, the computer 1900 can lack certain illustrated components. For example, a computer system 1900 acting as a multi-tenant system 110 may lack a keyboard 1910 and a pointing device 1914. Moreover, the storage device 1908 can be local and/or remote from the computer 1900 (such as embodied within a storage area network (SAN)).

The computer 1900 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1908, loaded into the memory 1906, and executed by the processor 1902.

The types of computer systems 1900 used by the entities of a system environment can vary depending upon the embodiment and the processing power used by the entity. For example, a client device may be a mobile phone with limited processing power, a small display 1918, and may lack a pointing device 1914. A multi-tenant system or a cloud platform, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

We claim:

1. A computer implemented method for deployment of software releases on cloud platforms, the method comprising:
   generating a plurality of deployment packages associated with a datacenter entity configured on a cloud platform, wherein a deployment package represents a version of pipeline templates, wherein a pipeline template comprises instructions to perform actions associated with a software release on the cloud platform, and one or more templating expressions representing placeholders for values;
   receiving a request for deploying a software release on the datacenter entity, the request specifying a version pointer representing a deployment package;
   identifying the deployment package represented by the version pointer;
   generating a dependency graph of pipeline templates of the deployment package, the dependency graph comprising an edge from a source pipeline template to a target pipeline template if a pipeline generated from the source pipeline template includes a link to a pipeline generated from the target pipeline template;
   generating a set of pipelines from the pipeline templates in a reverse order of dependencies indicated by the dependency graph, wherein a pipeline represents actions for deployment of the software release on the cloud platform; and
   sending the set of pipelines for execution.

2. The computer implemented method of claim 1, wherein generating of a deployment package comprises:
   receiving a request for a system configuration change associated with the datacenter entity;
   generating a deployment package based on a plurality of pipeline templates associated with the system configuration change; and
   storing the deployment package.

3. The computer implemented method of claim 1, wherein generating of each deployment package comprising further comprises:
   creating a version identifier for deployment package, wherein the version pointer stores a version identifier of the deployment package represented by the version pointer.

4. The computer implemented method of claim 1, wherein the deployment package represented by the version pointer is a first deployment package, the request is a first request, the set of pipelines is a first set of pipelines, the method further comprising:
   modifying the version pointer to point at a second deployment package from the plurality of deployment packages;
   receiving a second request for deploying a second software release on the datacenter entity;
   identifying the second deployment package represented by the version pointer;
   generating a second set of pipelines based on the second deployment package; and
   sending the second set of pipelines for execution.

5. The computer implemented method of claim 3, wherein the version pointer is modified in response to a request to roll back a service running on the datacenter entity to a previous configuration.

6. The computer implemented method of claim 1, wherein the version pointer is a stable version pointer identifying a stable deployment package, further maintaining in association with the datacenter entity, a latest version pointer representing a deployment package comprising pipeline templates incorporating a latest system configuration change.

7. The computer implemented method of claim 1, wherein the request is a first request, wherein the set of pipelines is a first set of pipelines, wherein the first request is for deploying the software release on a first cloud platform, wherein the first set of pipelines is sent for execution on a pipeline execution engine of the first cloud platform, the method further comprising:
   receiving a second request for deploying the software release on a second cloud platforms; and
   generating a second set of pipelines from the pipeline templates, wherein the second set of pipelines is sent for execution on a pipeline execution engine of the second cloud platform.

8. The computer implemented method of claim 1, wherein the request is a first request and the datacenter entity is a first datacenter entity, wherein the first request is for deploying the software release on the first datacenter entity, the method further comprising:
   receiving a second request for deploying the software release on a second datacenter entity; and
   generating a second set of pipelines from the pipeline templates, wherein the execution of the second set of pipelines causes the software release to be deployed on the second datacenter entity.

9. The computer implemented method of claim 1, wherein the plurality of deployment packages is stored in a file system, wherein each deployment package comprises a set of pipeline templates stored in a directory.

10. The computer implemented method of claim 2, wherein a deployment package comprises a plurality of partially hydrated pipeline templates generated from the plurality of pipeline templates, wherein a partially hydrated pipeline template is generated by substituting one or more templating expressions of a pipeline template with actual values obtained from metadata describing the datacenter entity.

11. The computer implemented method of claim 10, wherein a pipeline template further comprises one or more templating expressions representing references to pipelines, wherein generating the set of pipelines based on the deployment package comprises:
   generating the set of pipelines from the plurality of partially hydrated pipeline templates, wherein a pipeline is generated from the partially hydrated pipeline template by substituting one or more templating expressions representing links with corresponding pipeline identifiers.

12. The computer implemented method of claim 1, wherein the datacenter entity comprises (1) one or more services or (2) one or more other data center entities.

13. The computer implemented method of claim 1, wherein datacenter entity represents a service group that specifies a set of clusters of computing nodes, wherein one or more services are executed on a cluster of computing nodes of the set of clusters of computing nodes.

14. The computer implemented method of claim 1, further comprising:
receiving, a cloud platform independent declarative specification of a data center, the cloud platform independent declarative specification configured to generate the data center on any of a plurality of cloud platforms and specified using a cloud platform infrastructure language.

15. The computer implemented method of claim 14, further comprising:
receiving, cloud platform independent declarative specification comprising metadata describing a datacenter configured to execute services on the cloud platform, the metadata describing a hierarchy of datacenter entities;
compiling the cloud platform independent declarative specification to generate a cloud platform specific data center representation for creating the data center on the cloud platform; and
sending the cloud platform specific data center representation and a set of instructions for execution on the cloud platform, wherein the cloud platform executes the instructions to configure the data center using the cloud platform specific data center representation.

16. A non-transitory computer readable storage medium storing instructions that when executed by a computer processor cause the computer processor to execute steps of a method for deployment of software releases on cloud platforms, the steps comprising:
generating a plurality of deployment packages associated with a datacenter entity configured on a cloud platform, wherein a deployment package represents a version of pipeline templates, wherein a pipeline template comprises instructions to perform actions associated with a software release on the cloud platform, and one or more templating expressions representing placeholders for values;
receiving a request for deploying a software release on the datacenter entity, the request specifying a version pointer representing a deployment package;
identifying the deployment package represented by the version pointer;
generating a dependency graph of pipeline templates of the deployment package, the dependency graph comprising an edge from a source pipeline template to a target pipeline template if a pipeline generated from the source pipeline template includes a link to a pipeline generated from the target pipeline template;
generating a set of pipelines from the pipeline templates in a reverse order of dependencies indicated by the dependency graph, wherein a pipeline represents actions for deployment of the software release on the cloud platform; and
sending the set of pipelines for execution.

17. The non-transitory computer readable storage medium of claim 16, wherein generating of a deployment package comprises:
receiving a request for a system configuration change associated with the datacenter entity;
generating a deployment package based on a plurality of pipeline templates associated with the system configuration change; and
storing the deployment package.

18. The non-transitory computer readable storage medium of claim 16, wherein the deployment package represented by the version pointer is a first deployment package, the request is a first request, the set of pipelines is a first set of pipelines, wherein the instructions further cause the computer processor to perform steps comprising:
modifying the version pointer to point at a second deployment package from the plurality of deployment packages;
receiving a second request for deploying a second software release on the datacenter entity;
identifying the second deployment package represented by the version pointer;
generating a second set of pipelines based on the second deployment package; and
sending the second set of pipelines for execution.

19. A computer system comprising:
a computer processor; and
a non-transitory computer readable storage medium storing instructions that when executed by the computer processor cause the computer processor to execute steps of a method for deployment of software releases on cloud platforms, the steps comprising:
receiving, metadata describing a datacenter configured to execute services on a cloud platform, the metadata describing a hierarchy of datacenter entities;
generating a plurality of deployment packages associated with a datacenter entity configured on a cloud platform, wherein a deployment package represents a version of pipeline templates, wherein a pipeline template comprises instructions to perform a set of actions associated with a software release on the cloud platform, and one or more templating expressions representing placeholders for values;
receiving a request for deploying a software release on the datacenter entity, the request specifying a version pointer;
identifying the deployment package represented by the version pointer representing a deployment package;
generating a dependency graph of pipeline templates of the deployment package, the dependency graph comprising an edge from a source pipeline template to a target pipeline template if a pipeline generated from the source pipeline template includes a link to a pipeline generated from the target pipeline template;
generating a set of pipelines from the pipeline templates in a reverse order of dependencies indicated by the dependency graph, wherein a pipeline represents actions for deployment of the software release on the cloud platform; and
sending the set of pipelines for execution.

20. The computer system of claim 19, wherein generating of a deployment package comprises:
receiving a request for a system configuration change associated with the datacenter entity;
generating a deployment package based on a plurality of pipeline templates associated with the system configuration change; and
storing the deployment package.

* * * * *

UNITED STATES PATENT AND TRADEMARK OFFICE
CERTIFICATE OF CORRECTION

PATENT NO. : 11,561,784 B2
APPLICATION NO. : 17/157583
DATED : January 24, 2023
INVENTOR(S) : Wiegley et al.

It is certified that error appears in the above-identified patent and that said Letters Patent is hereby corrected as shown below:

In the Claims

In Column 42, in Claim 7, Line 28, delete "platforms;" and insert -- platform; --, therefor.

Signed and Sealed this
Fifth Day of September, 2023

Katherine Kelly Vidal
*Director of the United States Patent and Trademark Office*